United States Patent
Rezaiean-Asel et al.

(10) Patent No.: US 12,505,427 B2
(45) Date of Patent: Dec. 23, 2025

(54) TOKEN PLATFORM WALLET ORCHESTRATION

(71) Applicant: Coinbase, Inc., Oakland, CA (US)

(72) Inventors: Armin Rezaiean-Asel, Seattle, WA (US); Zhi Yang Wong, Sunnyvale, CA (US); Xiang Li, Kirkland, WA (US)

(*) Notice: Subject to any disclaimer, the term of this patent is extended or adjusted under 35 U.S.C. 154(b) by 126 days.

(21) Appl. No.: 17/981,357

(22) Filed: Nov. 4, 2022

(65) Prior Publication Data

US 2024/0152911 A1    May 9, 2024

(51) Int. Cl.
*G06Q 20/36*    (2012.01)

(52) U.S. Cl.
CPC ..... *G06Q 20/3678* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 11,769,145 B1 * | 9/2023 | Martinez | G06T 11/206 705/39 |
| 11,853,982 B1 * | 12/2023 | Woodward | G06Q 40/03 |
| 2019/0130487 A1 * | 5/2019 | De Beer | G06Q 40/06 |
| 2021/0097528 A1 * | 4/2021 | Wang | H04L 9/30 |
| 2021/0133735 A1 * | 5/2021 | Maim | G06Q 20/06 |
| 2021/0264421 A1 | 8/2021 | Altman | |
| 2022/0164872 A1 * | 5/2022 | Biorge | G06Q 40/12 |
| 2022/0172195 A1 | 6/2022 | Wilson, Jr. | |
| 2023/0052756 A1 * | 2/2023 | Sells | G06Q 20/02 |
| 2023/0119912 A1 | 4/2023 | Kinsey | |

FOREIGN PATENT DOCUMENTS

WO    2020153688 A1    7/2020

* cited by examiner

*Primary Examiner* — Jacob C. Coppola
*Assistant Examiner* — Christine Dang
(74) *Attorney, Agent, or Firm* — Holland & Hart LLP

(57) ABSTRACT

A custodial token platform may implement wallet orchestration techniques. For example, the custodial token platform may process a corpus of transaction data associated with a custodial token platform. The data may indicate movements of a crypto token between outbound addresses of the custodial token platform and a cold address managed by the custodial token platform. The custodial token platform may simulate movements of the crypto token between the outbound addresses and the cold address using a plurality of balance configurations that define one or more balance thresholds for the outbound addresses and determine a balance configuration for the outbound address and the cold address based on the simulation. The custodial token platform may then broadcast one or more transactions that are configured to move the crypto token between the outbound addresses and the cold address based at least in part on the determined balance configuration.

17 Claims, 16 Drawing Sheets

TOKEN PLATFORM WALLET ORCHESTRATION

FIELD OF TECHNOLOGY

The present disclosure relates generally to database systems and data processing, and more specifically to token platform wallet orchestration.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
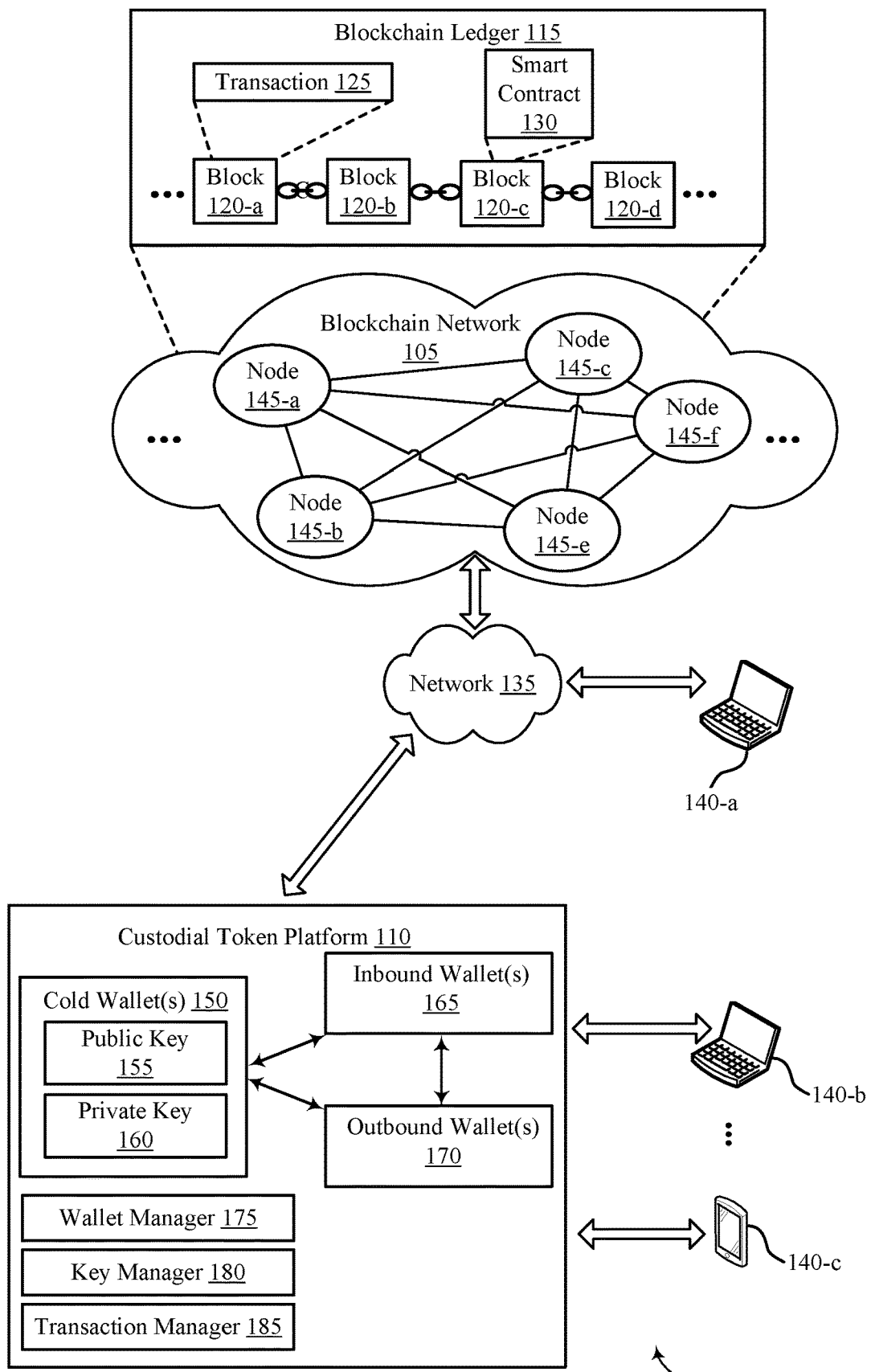
FIG. 1 illustrates an example of a digital token management system that supports token platform wallet orchestration in accordance with aspects of the present disclosure.

A user may access a custodial token platform to purchase, sell, exchange, or trade digital assets, such as cryptocurrencies, crypto tokens, or the like. A custodial token platform may support various types of wallets for deposits, withdrawals, and storage. For example, the custodial token platform may generate inbound wallets associated with inbound addresses for user deposits of crypto tokens to accounts associated with the user. The custodial token platform may also use outbound wallets for supporting withdrawals of crypto tokens and cold storage wallets for security. In some cases, the custodial token platform may support a wallet orchestration procedure that moves the crypto tokens between the various wallets of the custodial token platform for various reasons including liquidity management and security. In some examples, the wallet orchestration may be performed manually by administrators of the custodial token platform or may be performed via a static configuration. However, as cryptocurrency markets are increasingly dynamic, wallet orchestration between various wallets of a custodial token platform is increasingly complex, and may require consideration of current market states, market histories, and current wallet balances.

Techniques described herein address the forgoing by supporting dynamic and automatic wallet orchestration between inbound wallets and outbound wallets (also referred to herein as hot wallets) and between cold wallets and outbound wallets. To support wallet orchestration between inbound wallets and outbound wallets of the custodial token platform, the custodial token platform may monitor for (e.g., via a blockchain ledger) inbound transactions that deposit crypto tokens to the inbound wallets. If the ratio of a token balance of one or more inbound wallets to a token balance of one or more outbound wallets exceeds a threshold, then the custodial token platform may broadcast a transaction (e.g., to a blockchain network supporting the blockchain ledger) that is configured to transfer at least a portion the balance of the crypto token at the one or more inbound wallets to one or more outbound wallets of the custodial token platform. The custodial token platform, after user activation, may also broadcast a withdrawal transaction that withdraws the crypto token from the outbound address to an external user address that is external to the custodial token platform.

To support wallet orchestration between a cold wallet and the outbound wallet, the custodial token platform may process a corpus of transaction data associated with the custodial token platform. The corpus of transaction data may include transactions associated with the custodial token platform and various wallets associated with the custodial token platform for a previous time period, such as one month, one year, etc. Using the corpus of transaction data and balance configurations (e.g., thresholds) for the outbound wallets, the custodial token platform may simulate movements of crypto tokens between the cold wallet and the outbound wallet. Based on the simulated movements, the custodial token platform may determine a balance configuration, apply the balance configuration to the outbound wallet, and broadcast one or more transactions that are configured to move the crypto token between the outbound wallet and the cold wallet based on the applied balance configuration.

Thus, these techniques may be used to dynamically move crypto tokens between various wallets of the custodial token platform, while considering market dynamics and improving security. Further, as liquidity is maintained at the custodial token platform, user experience may be improved based on reduced withdrawal transaction times.

Aspects of the disclosure are initially described in the context of an environment supporting a custodial token platform. Aspects of the disclosure are further described with a computing environment, transaction diagrams, a blockchain diagram, a wallet orchestration procedure, and process flow diagrams. Aspects of the disclosure are further illustrated by and described with reference to apparatus diagrams, system diagrams, and flowcharts that relate to token platform wallet orchestration.

FIG. 1 illustrates an example of a computing environment 100 for cloud computing that supports token platform wallet orchestration in accordance with various aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145-c may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract is called by another device.

A computing device 140 may be used to input information to or receive information from the computing system custodial token platform 110, the blockchain network 105, or both. For example, a user of the computing device 140-a may provide user inputs via the computing device 145-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, typically using a smart contract or a decentralized application ("Dapp"). The smart contract or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis. Additionally, the flush transactions may be provided such as to support liquidity of a crypto token and/or withdrawals of a crypto token. For example, if a user attempts to withdraw a crypto token from the user account associated with the custodial token platform 110, and there are not enough funds in the outbound wallet 170 to cover the withdrawal, then the transaction time for the withdrawal may be increased, as funds may be supplied to the outbound wallet 170 from an inbound wallets 165 or the cold wallet 150 via another transaction to support the withdrawal. Depending on the blockchain network 105 associated with token being withdrawn and/or the state of the blockchain network 105, these transactions may involve significant amounts of time. As such, a withdrawal may be delayed, which may result in unsatisfactory user experience.

Additionally, the custodial token platform 110 may maintain a balance in the cold wallet 150 for one or more crypto tokens for security reasons and business reasons. For example, the custodial token platform 110 may maintain a balance in a cold wallet 150 for insurance conditions, to support stable tokens, and to mitigate risk. However, in some cases, tokens may be moved from the cold wallets 150 to the outbound wallets 170 to support withdrawals and liquidity. However, maintaining a relatively large balance on an outbound wallet 170 may increase risk and exposure.

Techniques described herein support automatic and dynamic transactions to move crypto tokens between the inbound wallets 165, the outbound wallets 170, and the cold wallets 150. For example, the custodial token platform 110 may be configured to broadcast transactions to move crypto tokens between the inbound wallets 165 and the outbound wallets 170 based on a configurable balance ratio. Additionally, or alternatively, the custodial token platform 110 may be configured to simulate movements of crypto tokens between the cold wallets 150 and the outbound wallets 170 based on various balance configurations or thresholds, and select a threshold based on the simulations. The custodial token platform 110 may broadcast transactions that move crypto tokens between the outbound wallets 170 and the cold wallets 150 based on the selected threshold or balance configuration.

It should be appreciated by a person skilled in the art that one or more aspects of the disclosure may be implemented in a computing environment 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
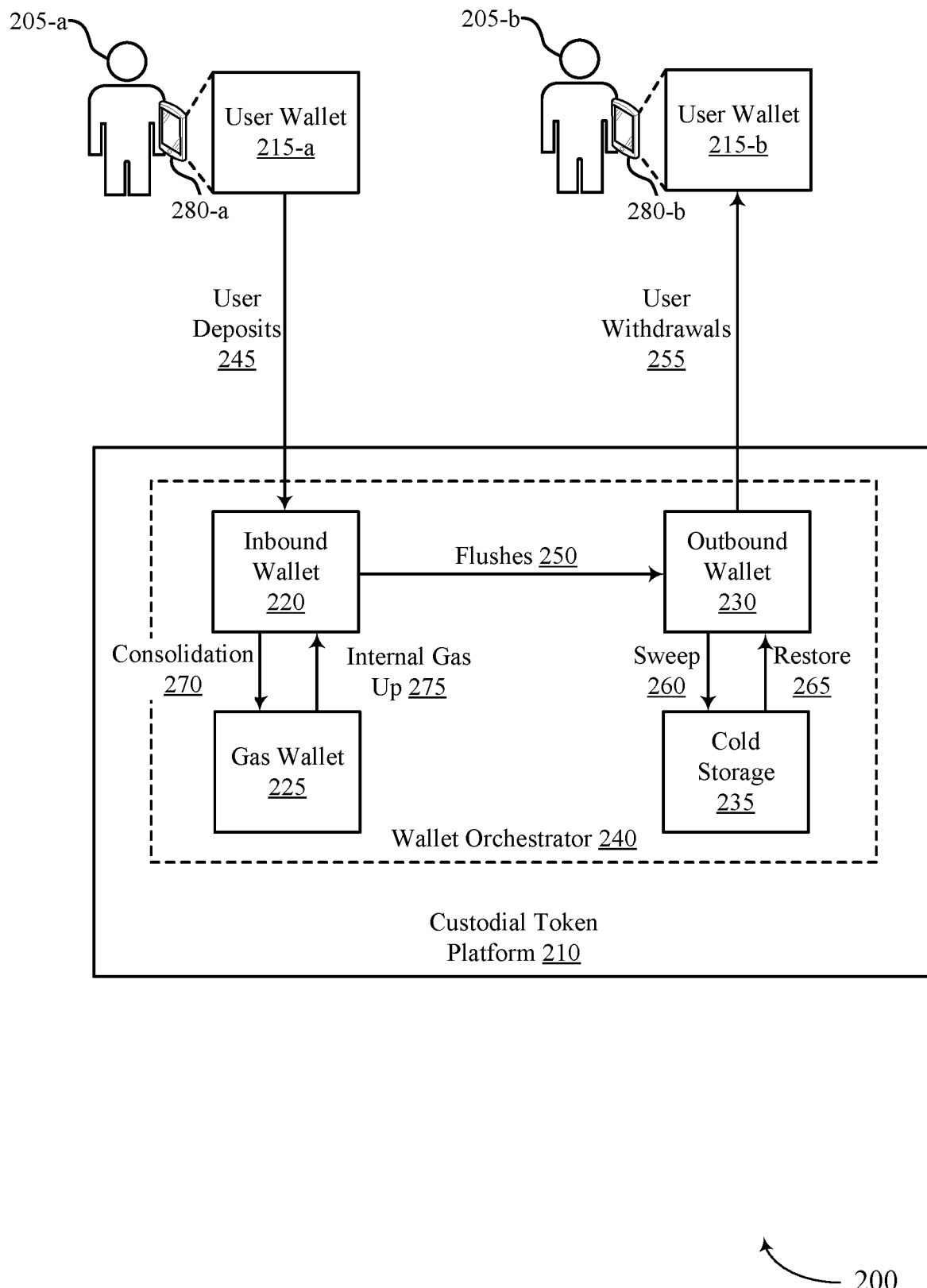
FIG. 2 illustrates an example of a computing environment that supports token platform wallet orchestration in accordance with aspects of the present disclosure.

FIG. 2 illustrates an example of a computing environment 200 that supports token platform wallet orchestration in accordance with aspects of the present disclosure. The computing environment 200 includes a custodial token platform 210 and users 205 with respective user device 280. The custodial token platform 210 may be an example of the custodial token platform 110 as described with respect to FIG. 1, and the user devices 280 may be examples of the computing devices 140 as described with respect to FIG. 1.

The custodial token platform 210 may support various wallets for various purposes. For example, the custodial token platform 210 supports inbound wallets 220, gas wallets 225, outbound wallets 170, and cold storage 235 (e.g., cold storage wallets). In some examples, the custodial token platform 210 may create or implement a new inbound wallet per user, per user account, or per deposit transaction 245. For example, the user 205-*a* may access a user wallet 215-*a* on the user device 280-*a* to generate and broadcast a deposit transaction 245 to deposit a crypto token to an account associated with the custodial token platform 210. The account may be associated with user 205-*a* or another user. In some examples, for each deposit transaction 245, the custodial token platform generates a new inbound wallet 220. In other cases, the custodial token platform 210 may maintain an inbound wallet 220 per user account (or per crypto token per user account or per blockchain network used by a user account).

Additionally, as described herein, the custodial token platform may broadcast transactions (e.g., to the blockchain network 105 of FIG. 1) to move crypto tokens between the various wallets of the custodial token platform 110. For example, the custodial token platform 210 may implement periodic flush transactions 250 to move crypto tokens between inbound wallets 220 and the outbound wallets 230. In some examples, the flush transactions 250 are periodic and used to support user withdrawal transactions 255. For example, a user may access a user account on the custodial token platform 210 (e.g., via the user device 280-*b*) and withdraw funds (via a withdrawal transaction 255) to the external user wallet 215-*b* or send funds to another external user wallet associated with another user.

In some cases, a job is executed periodically to perform the flush transactions 250. The job may select a set of inbound addresses with the highest balances (e.g., top ten inbound addresses with the highest balances). The job may flush the balances in an order determined by the balance and prioritize outbound wallets 230 to target the flushes (e.g., receive the crypto tokens). In some examples, the job may consider the balance and the gas fee to determine whether to flush an inbound wallet 220. For example, if the balance is greater than three times the gas fee (e.g., network fee), then the job may flush the balance. In some cases, the custodial token platform 210 may use the gas wallet 225 to consolidate crypto tokens (e.g., via a consolidation transaction 270) and to leverage for providing assets (e.g., crypto tokens) to cover transaction fees (e.g., via internal gas up transactions 275). For example, after determining to flush one of the inbound wallets 220, the custodial token platform may provide tokens to the inbound wallet 220 via the internal gas up transaction 275 and flush the inbound wallet 220 via the flush transaction 250. Any tokens remaining in the inbound wallet 220 after the flush may be provided to the gas wallet 225 via a consolidation transaction 270. In some examples, these various transactions may result in large amount of network fees (e.g., fees for the blockchain network 105 of FIG. 1). Further, the job may flush an inbound wallet 220, and the flush transaction 250 may move an amount of crypto token that is less than the actual network fees. Additionally, this technique effectively flushes crypto tokens from inbound to outbound almost immediately after a deposit transaction.

Techniques described herein support providing crypto tokens to the outbound wallets 230 via the flush transactions 250 in a more dynamic manner. For example, a wallet orchestrator 240 of custodial token platform 210 may monitor for deposit transactions 245 to the inbound wallets 220 maintained by the custodial token platform 210. The wallet orchestrator 240 may monitor for such transactions via the blockchain ledger (e.g., blockchain ledger 115 of FIG. 1). The custodial token platform may identify such transactions and maintain or identify a balance associated with the inbound wallets. If the ratio of the balances between the inbound wallet and the outbound wallet 230 exceeds a threshold, then the wallet orchestrator 240 may generate and broadcast a flush transaction 250 to move an amount of the crypto token from the inbound wallet 220 to the outbound wallet 230. In some examples, the ratio is based on balances attributed to one or both of multiple inbound wallets 220 and multiple outbound wallets 230. Additionally, or alternatively, the wallet orchestrator 240 may maintain the balance ratio based on monitoring for inbound deposit transactions 245 and may flush an inbound wallet 220 when the balance reaches the threshold.

In some examples, the wallet orchestrator 240 may monitor network fees and perform the flush transactions 250 based on the network fees. For example, if the network fee is less than a threshold (and the balance ratio conditions are satisfied), then the wallet orchestrator 240 may determine to generate and broadcast the flush transaction 250 to flush the inbound wallet 220. If, however, the network fee is greater than the threshold, then the wallet orchestrator 240 may determine to delay broadcasting/transmitting the flush transaction 250 until the network fee is less than a threshold. Further, as described herein, the wallet orchestrator 240 may monitor balances of multiple inbound wallets 220 and outbound wallets. The wallet orchestrator 240 may select a quantity of inbound addresses based on the balances (e.g., ten wallets with N highest balances) for flushing, provided other conditions are satisfied. Additionally, before flushing an inbound wallet 220, the wallet orchestrator 240 may determine whether the inbound wallet 220 is associated with another transaction that may be pending on the blockchain. More particularly, if the inbound wallet 220 is associated with a pending transaction, then the wallet orchestrator 240 may skip flushing the wallet in order to be sure that conditions are satisfied after the transaction is confirmed or to be sure that the other transaction is not another flush transaction 250, which may cause a balance discrepancy.

As such, by enabling this flushing by the wallet orchestrator 240, the inbound wallets 220 are effectively able to build up balances (e.g., up to a predefined limit) before funds are moved to outbound wallets 230), which may result in a reduced quantity of flush transactions and therefore reduced network fees and reduced resource overhead. In some examples, as described herein, the system may be modeled to determine the limits such that the transaction fees are limited/reduced, while maintaining liquidity and balances at the outbound wallets 230. Additionally, the limit or threshold may be determined to limit impact on sweep, restores, and withdrawal times. Further, the techniques described herein may be applicable to multiple different layer one and layer two crypto tokens.

Additionally, the wallet orchestrator 240 may broadcast sweep transactions 260 to move crypto tokens from the outbound wallets 230 to the cold storage 235 and restore transactions 265 to move crypto tokens from the cold storage 235 to the outbound wallet 230. For example, the wallet orchestrator 240 may perform the sweep transaction 260 when the balance of the outbound wallet 230 (e.g., a hot wallet) is greater than a maximum balance threshold. Further, the wallet orchestrator 240 may perform a restore transaction 265 when the balance of the outbound wallet 230 is less than a minimum balance threshold. The maximum and minimum balance may be configured to maintain liquidity at the hot wallet (e.g., to support withdrawal transactions 255) and security, by maintaining a low risk profile with funds in the cold storage 235. However, as cryptocurrency markets are dynamic, static thresholds may result in increased risk and long withdrawal times for withdrawal transactions 255 due to not having enough funds in the outbound wallet 230 to support current withdrawals. Further, the use of static thresholds may result in increased network fees due to the quantity and timing of sweep transactions 260 and restore transactions 265.

Techniques described herein address the forgoing by providing dynamic outbound wallet 230 balance thresholds that may be based on historical transaction data. These thresholds may change based on how new the crypto token is (e.g., in terms of when the custodial token platform 210 added support for the crypto token), trading volume, withdrawal volume, etc. To support these dynamic thresholds, the wallet orchestrator 240 may implement a simulator that uses historical transaction data for one or more crypto tokens to model the use of different balance thresholds and resulting quantity of restore transactions 265, sweep transactions 260, and withdrawal transactions 255 (e.g., send requests) that are waiting for liquidity at the outbound wallet 230. The model may select balance thresholds that result in a reduced quantity of restore transactions 265 and sweep transactions 260 while limiting or reducing the quantity of send requests that are waiting for liquidity. As such, the balance thresholds may be selected such as to reduce transaction fees and to reduce withdrawal times, which may result in reduced resource overhead and improved user experience.

Figure 3A:
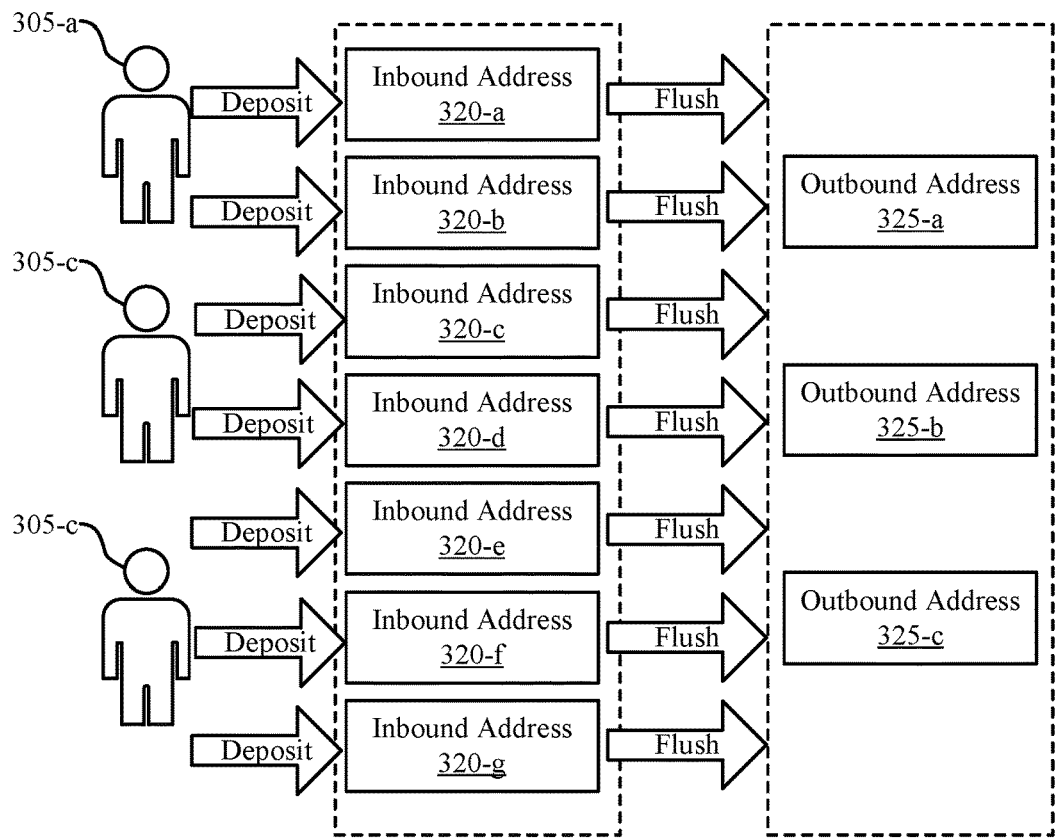
FIG. 3A and FIG. 3B illustrate examples of transaction diagrams that support token platform wallet orchestration in accordance with aspects of the present disclosure.
Figure 3B:
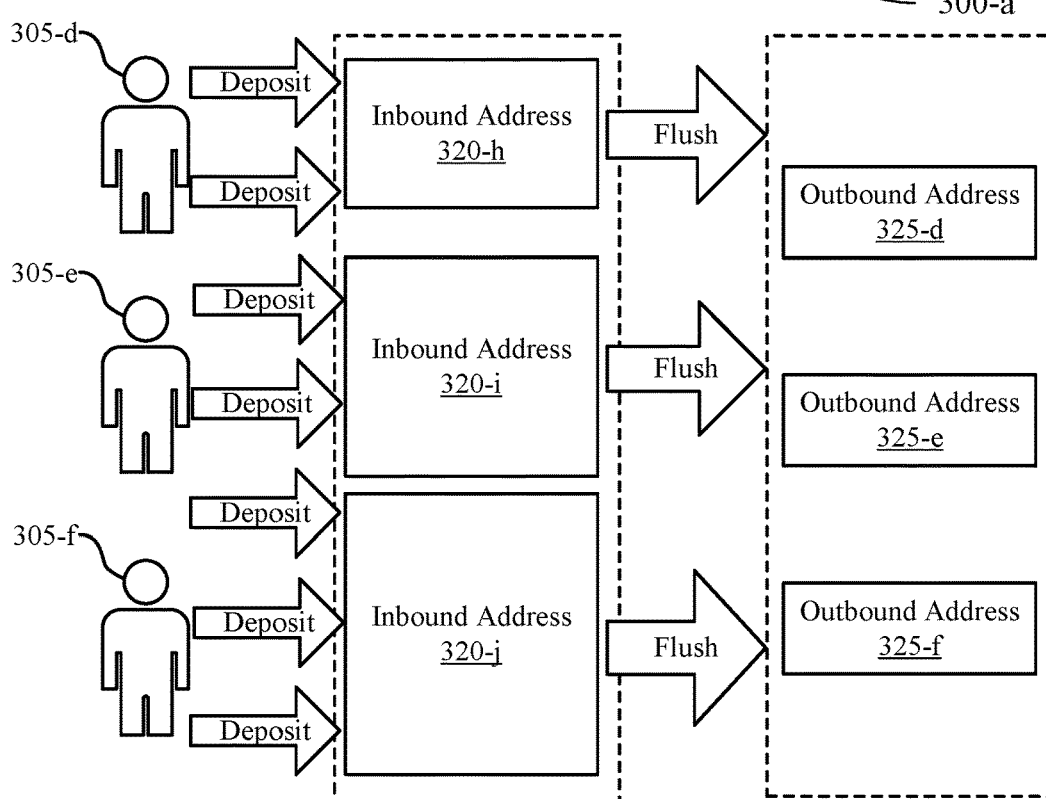

FIG. 3A and FIG. 3B illustrate examples of transaction diagrams 300 that support token platform wallet orchestration in accordance with aspects of the present disclosure. The transaction diagrams 300 may be implemented by a custodial token platform, such as custodial token platform 110 of FIG. 1 and custodial token platform 210 of FIG. 2. The transaction diagrams 300 includes users 305, inbound addresses 320 and outbound addresses 325. The inbound address 320 may be examples of the inbound wallets as described with respect to FIGS. 1 and 3, and the outbound addresses may be examples of the outbound wallets as described with respect to FIGS. 1 and 2.

In the transaction diagram 300-a, the custodial token platform may generate a new inbound address 320 for each deposit transaction. That is, each time a user deposits a crypto token to an account associated with the custodial token platform, the custodial token platform may generate a new inbound address 320. As described herein, the custodial token platform may periodically flush the inbound addresses. However, generation of a new inbound address 320 for each inbound deposit transition results in many inbound addresses that may be flushed, resulting in any flush transactions. Multiple flush transactions may incur significant network fees and resource overhead at the custodial token platform. Further, as described herein, the flushes of FIG. 3A may be performed according to a timed configuration (e.g., every few minutes), which may result in some sub-optimal flush transactions (e.g., high fees, low transaction amounts).

In the transaction diagram 300-b, the custodial token platform may generate the inbound address 320 per user or per user account (if the user agrees to or enables this feature at the custodial token platform). This technique or configuration results in fewer inbound address 320 and fewer flush transactions. Further, as the flush transactions may be performed based on balances (rather than a timed configuration), the flushes may maximize the transfer amounts, resulting in fewer transfers, reduced overall transactions fees, and reduced resource overhead at the custodial token platform. Further, in FIG. 3B, the wallet orchestrator may access balances associated with both the inbound addresses 320 and the outbound addresses 325 in order to identify balance ratios to determine whether to perform flush transactions.

Figure 4:
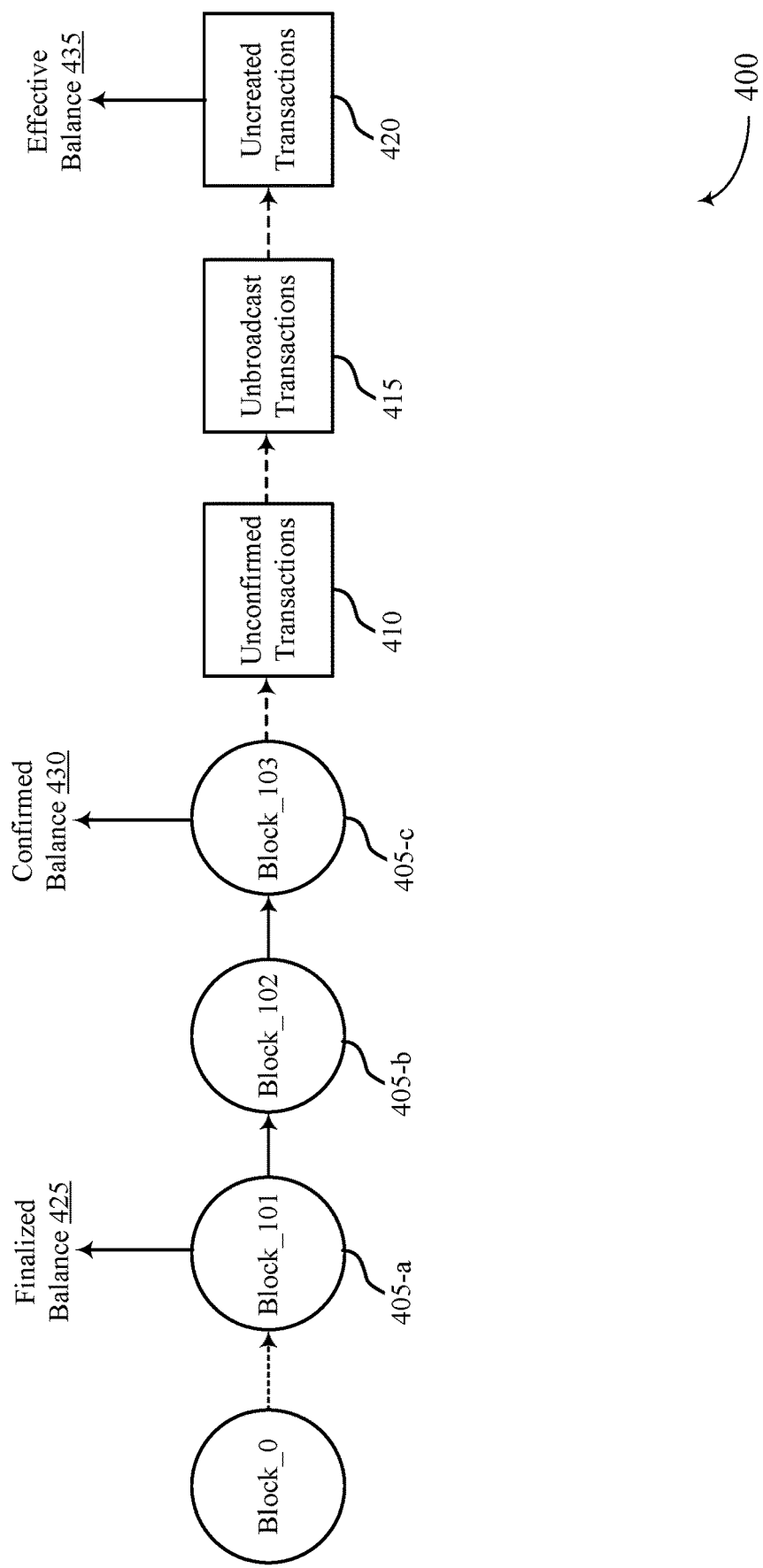
FIG. 4 illustrates an example diagram of a blockchain that supports token platform wallet orchestration in accordance with aspects of the present disclosure.

FIG. 4 illustrates an example of a diagram of a blockchain 400 that supports token platform wallet orchestration in accordance with aspects of the present disclosure. The blockchain 400 may be an example of the blockchain ledger 115 as described with respect to FIG. 1 and may be used by the custodial token platform described herein. Specifically, the blockchain 400 illustrates various possible states associated with blocks of transactions in the blockchain. As the blockchain network is used, transactions are added to blocks, and blocks are added to the end of the blockchain. After blocks are added, the transactions/blocks may be confirmed by multiple network nodes. As such, blocks 405 include transactions that are considered confirmed. Further, because of the quantity of confirmations and the quantity of blocks added to its chain, the transactions on block 405-a (and blocks before block 405-a) are considered final. Thus, the custodial token platform may access block 405-a to identify a finalized balances 425 associated with various wallets of managed by the blockchain network, including inbound wallets, outbound wallets, and cold wallets, as described herein. The custodial token platform may access block 405-c to identify a confirmed balance 430 associated with the various wallets. Block 410 includes unconfirmed transactions, block 415 includes unbroadcast transactions, and block 420 includes uncreated transactions. Blocks 415 and 420 may not exist on the blockchain, but correspond to balances that may be estimated by the custodial token platform based on balances and statuses of the wallets of the custodial token platform and/or queued but unbroadcast or un-generated transactions.

The custodial token platform may implement an application programming interface (API) that may be used by various aspects of the custodial token platform, such as a wallet orchestrator as described herein. For example, the API may provide access to a hot wallet balance (e.g., an outbound wallet balance) ("H"), which may include the sum of balances of some or all hot addresses. The API may also provide access to a list of the outbound wallet balances ("O") and a unassigned outbound amount ("U"), which may correspond to total amount of transactions that have not been assigned to an outbound address. The API may also provide a pending outbound amount balance ("P") which corresponds to a total amount of transactions that have been sent to outbound wallets but have not been confirmed on the blockchain 400. Thus, an effective outbound balance may correspond to a sum of outbound balances minus the unassigned outbound amount (SUM(O)−U). The effective hot wallet balance may corresponding to the hot wallet balance minus the unassigned outbound amount and minus the pending outbound amount (H−U−P). The effective inbound balance is the effective hot wallet balance minus the effective outbound balance.

As described herein, the wallet orchestrator may access these balances (e.g., via the API) to determine and implement flush transactions, restore transactions, and sweep transactions. For example, the wallet orchestrator may list the top N inbound addresses with the highest balances. The wallet orchestrator may ignore addresses with low balances (e.g., less than 3*gas fees) and ignore address that have pending transactions. The wallet orchestrator may create transactions for the remaining inbound addresses. To create a flush transaction, the wallet orchestrator may provide an inbound address as the "from address" parameter, and the corresponding wallet balance is synchronously updated (internally) after successful creation of the transaction. The wallet orchestrator may also return the actual amount of the transaction in order to flush the entire balance of the inbound address, which is subject to change due to external deposits. The wallet orchestrator may check the status of the flush transactions, and amounts of non-confirmed flush transactions may be deducted from the hot wallet balance when calculating an effective inbound balance.

Figure 5:
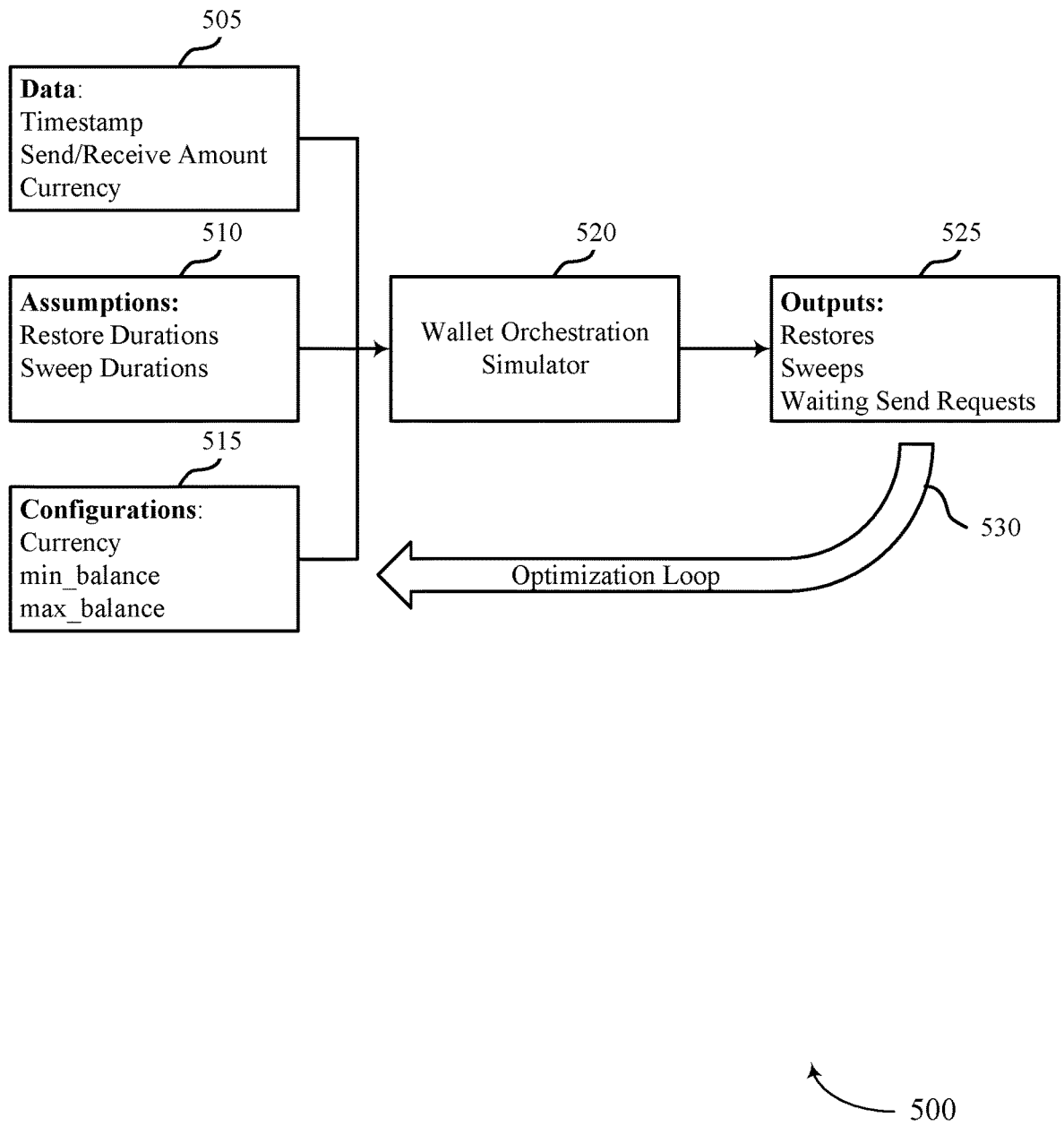
FIG. 5 illustrates an example diagram of a simulation procedure that supports token platform wallet orchestration in accordance with aspects of the present disclosure.

FIG. 5 illustrates an example diagram of a simulation procedure 500 that supports token platform wallet orchestration in accordance with aspects of the present disclosure. The simulation procedure 500 includes a wallet orchestration simulator 520, which receives inputs, including data 505, assumptions 510 and configurations 515 and generates outputs 525. A custodial token platform described herein may implement the simulation procedure 500 to support dynamic balance configuration determination (e.g., balance thresholds) for improved security and user experience, as described herein.

The data 505 may be based on a corpus of transaction data associated with the custodial token platform. For example, the corpus of transaction data may include transactions associated with the movement of crypto tokens between an outbound wallet (e.g., a hot wallet) and a cold wallet of the custodial token platform and transactions associated with withdrawals of a crypto token from the custodial token platform. The data 505 may include a timestamp associated with a plurality of such transactions, send or receive amounts, and the currency (e.g., the crypto token). The wallet orchestration simulator 520 may also use assumptions 510 for the simulations, and the assumptions 510 may include restore durations and sweep durations. The restore durations and the sweep durations may correspond to an average time period between broadcasting a transaction and confirmation of the transaction on the corresponding blockchain. In some examples, the durations are different depending on the timestamp associated with the transaction such that the duration is longer during an active transaction period on the blockchain network and shorter during less active period on the blockchain network. As such, the durations may be based on the timestamp corresponding to the transactions.

The wallet orchestration simulator 520 may also use a set of configurations 515 as inputs, and the configurations 515 may include a currency, a minimum balance for the outbound wallet, and a maximum balance of the outbound wallet. Using the various inputs and assumptions, the wallet orchestration simulator 520 may simulate the movements of one or more crypto tokens between the outbound address and the cold address and generate outputs 525, which include the quantity of restore transactions, the quantity of sweep transactions, and the quantity of waiting send requests (based on lack of liquidity at the outbound wallet) that occur during the simulation period. The wallet orchestration simulator 520 may generate the outputs 525 for a quantity of configurations 515. In some examples, the wallet orchestration simulator 520 utilizes an optimization loop 530, which is used to input the generated outputs into the wallet orchestration simulator 520 as updated data 505. The wallet orchestration simulator 520 may be re-executed using the updated data and different balance configurations 515. In some examples, the wallet orchestration simulator 520 monitors a ratio of total of outbound wallet addresses to the cold wallet, and determines whether the ratio is exceeded during the simulation. If the ratio is exceeded, the balance configuration may be adjusted such that the ratio is not exceeded during the simulation. As such, the utilization and monitoring of the ratio may be an example of implementation of the optimization loop 530.

After a series of execution of the wallet orchestration simulator 520, one or more outputs 525 may be selected for use as the balance configuration for the outbound wallet. The output 525 that results in reduced withdrawal times and/or reduced quantity of sweep/restore transaction may be selected as the balance configuration. In some cases, a set of balance configurations (e.g., outputs 525) may be displayed to an administrator of the custodial asset platform, and the administer may selectively activate a balance configuration. Further, the simulation may be periodically executed and used to update (automatically or with user input) the balance configuration.

Figure 6:
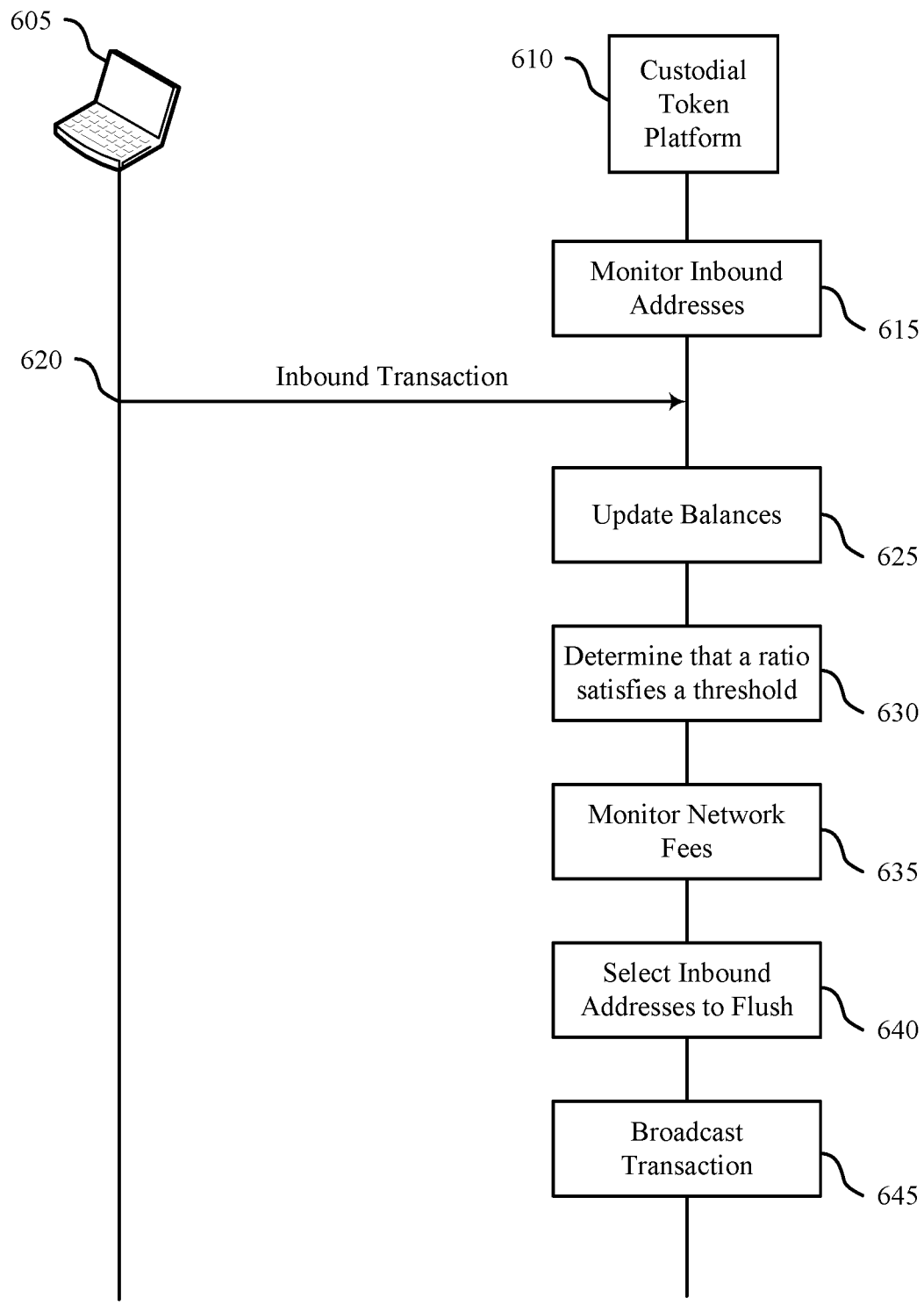
FIG. 6 illustrates an example of a process flow that supports token platform wallet orchestration in accordance with aspects of the present disclosure.

FIG. 6 illustrates an example of a process flow 600 that supports token platform wallet orchestration in accordance with aspects of the present disclosure. The process flow 600 includes a user device 605 and a custodial token platform 610, which may be examples of the corresponding devices described herein. In the following description of the process flow 600, the operations between the user device 605 and the custodial token platform 610 may be transmitted in a different order than the example order shown, or the operations performed may be performed in different orders or at different times. Some operations may also be omitted from the process flow 600, and other operations may be added to the process flow 600.

At 615, the custodial token platform 610 may monitor, via a blockchain, an inbound address controlled by a custodial token platform. The inbound address may be associated with a user of the custodial token platform and configured to receive a plurality of different inbound transactions. At 620, the custodial token platform 610 may identify, based at least in part on the monitoring, one or more inbound transactions that indicate transfer of a crypto token from a first user address external to the custodial token platform to the inbound address controlled by the custodial token platform.

At 625, the custodial token platform 610 may monitor amounts of the crypto token attributed to a plurality of inbound addresses and outbound addresses associated with users of the custodial token platform. That is, the custodial token platform may monitor balances associated with a set of inbound addresses and a set of outbound addresses. In some examples, the custodial token platform 610 may generate an amount of the crypto token attributed to the inbound address (e.g., a balance) based at least in part on an amount attributed to the inbound address via the blockchain and one or more pending transactions associated with the inbound address. In such cases, the ratio is dependent generated amount of the crypto token attributed to the inbound address.

At 630, the custodial token platform 610 may determine that a ratio associated with an amount of the crypto token attributed to the inbound address and an amount of the crypto token attributed to an outbound address satisfies a threshold.

At 635, the custodial token platform 610 may monitor a network fee estimation associated with a transaction for the blockchain. In some examples, the custodial token platform 610 may determine whether the network fee is less than a threshold network fee.

At 640, the custodial token platform 610 may select a quantity of inbound addresses of the plurality of outbound addresses based on a respective amount attributed to each of the quantity of inbound addresses being greater than a threshold amount. That is, the custodial token platform may skip or not flush inbound addresses that do not have an threshold balance. In some examples, the inbound addresses are selected in response determining that the inbound addresses are not associated with a third transaction that is pending (e.g., an unverified transaction on the blockchain).

At 645, the custodial token platform 610 may broadcast, based at least in part on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. In some examples, the second transaction is broadcast in response to determining that the network fee is less than a threshold network fee. Additionally, or alternatively, the custodial token platform 610 is broadcast for each selected inbound address.

Figure 7:
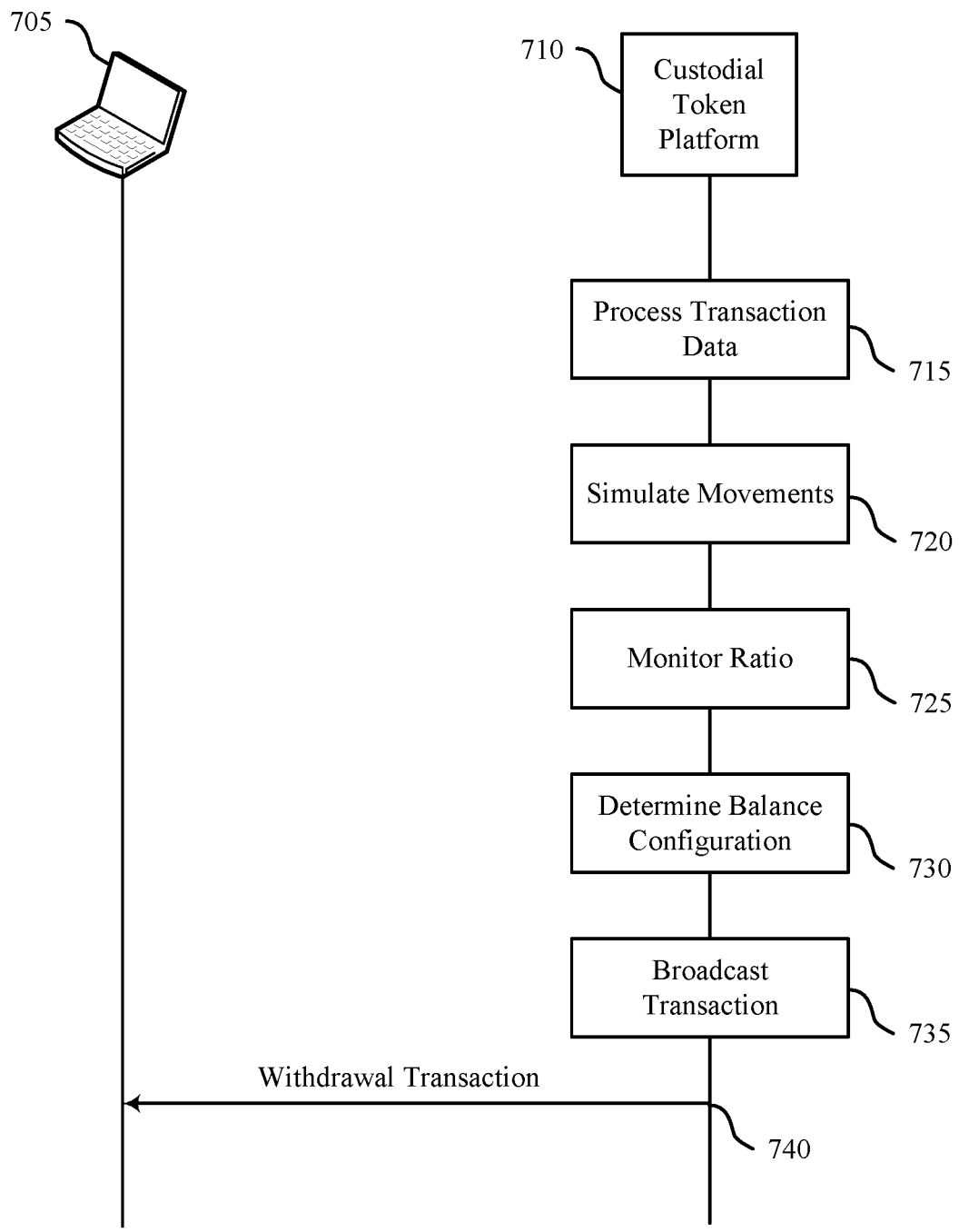
FIG. 7 illustrates an example of a process flow that supports token platform wallet orchestration in accordance with aspects of the present disclosure.

FIG. 7 illustrates an example of a process flow 700 that supports token platform wallet orchestration in accordance with aspects of the present disclosure. The process flow 700 includes a user device 705 and a custodial token platform 710, which may be examples of the corresponding devices described herein. In the following description of the process flow 700, the operations between the user device 705 and the custodial token platform 710 may be transmitted in a different order than the example order shown, or the operations performed may be performed in different orders or at different times. Some operations may also be omitted from the process flow 700, and other operations may be added to the process flow 700.

At 715, the custodial token platform 710 may process a corpus of transaction data associated with a custodial token platform. The corpus of transaction data may indicate movements of a crypto token between outbound addresses of the custodial token platform and a cold address managed by the custodial token platform. For example, the corpus of transaction data may include transaction timestamps, transaction amounts, and the crypto token that is transacted over a duration. Processing the corpus of transaction data may include extracting such information from the corpus (extracting the information from the blockchain) and formatting the information to be ingested by a wallet orchestration simulation procedure.

At 720, the custodial token platform 710 may simulate, based at least in part on the corpus of transaction data, movements of the crypto token between the outbound addresses and the cold address using a plurality of balance configurations that define one or more balance thresholds for the outbound addresses. For example, the custodial token platform 710 may apply a minimum and maximum threshold for the outbound wallet and simulate movements of the crypto token between the inbound and outbound wallet, as well as between the outbound wallet and external user addresses (e.g., self-custodial wallets) based on withdrawal transactions. Thus, in some examples, the custodial token platform 710 may generate a quantity of sweep transactions that correspond to movements of the crypto token from the outbound address to the cold address and generate a quantity of restore transactions that correspond to movements of the crypto token between the cold address to the outbound address. The custodial token platform 710 may also compare the simulated movements with movements corresponding to the corpus of transaction data. That is, the custodial token platform 710 may determine whether the balance configurations applied during the simulation result in fewer or more sweep and restore transactions or fewer or more waiting withdrawal transactions. In some examples, the custodial token platform may simulate movements using one or more constraints for the outbound addresses, and the one or more constraints may include a maximum balance for the outbound addresses, a ratio of a minimum balance of the outbound addresses to the maximum balance for the outbound addresses, a maximum increase of the maximum balance for the outbound address over a duration, and a maximum decrease of the maximum balance for the outbound address over the duration.

At 725, during simulation, the custodial token platform 710 may monitor a ratio of total balance of outbound addresses to a balance of the cold address. If the ratio exceeds a threshold, then the simulation may implement a sweep transaction or may determine to adjust the balance configuration applied to the simulation such that the threshold ratio is not exceeded.

At 730, the custodial token platform 710 may determine, based at least in part on simulating the movements, a balance configuration for the outbound addresses and the cold address. The balance configuration may correspond to a maximum balance and a minimum balance of the cold address. In some examples, the custodial token platform 710 may display, at a user interface associated with the custodial token platform, an indication of the determined balance configuration and receive an indication of acceptance of the balance configuration. The balance configuration may be applied to outbound wallets associated with one or more crypto tokens.

At 735, the custodial token platform may broadcast one or more transactions that are configured to move the crypto token between the outbound addresses and the cold address based at least in part on the determined balance configuration. That is, the custodial token platform 710 may broadcast sweep transactions and/or restore transactions based on the balance configuration.

At 740, the custodial token platform may broadcast a withdrawal transaction that is configured to move a crypto token to a user address that is external to the custodial token platform. The withdrawal transaction may be performed in response to a withdrawal or send request by a user at the custodial token platform. The withdrawal may impact the balance of the outbound wallet, and as such, the custodial token platform may broadcast other restore transactions to move crypto tokens from the cold wallet to the outbound wallet to ensure liquidity for other withdrawals.

Figure 8:
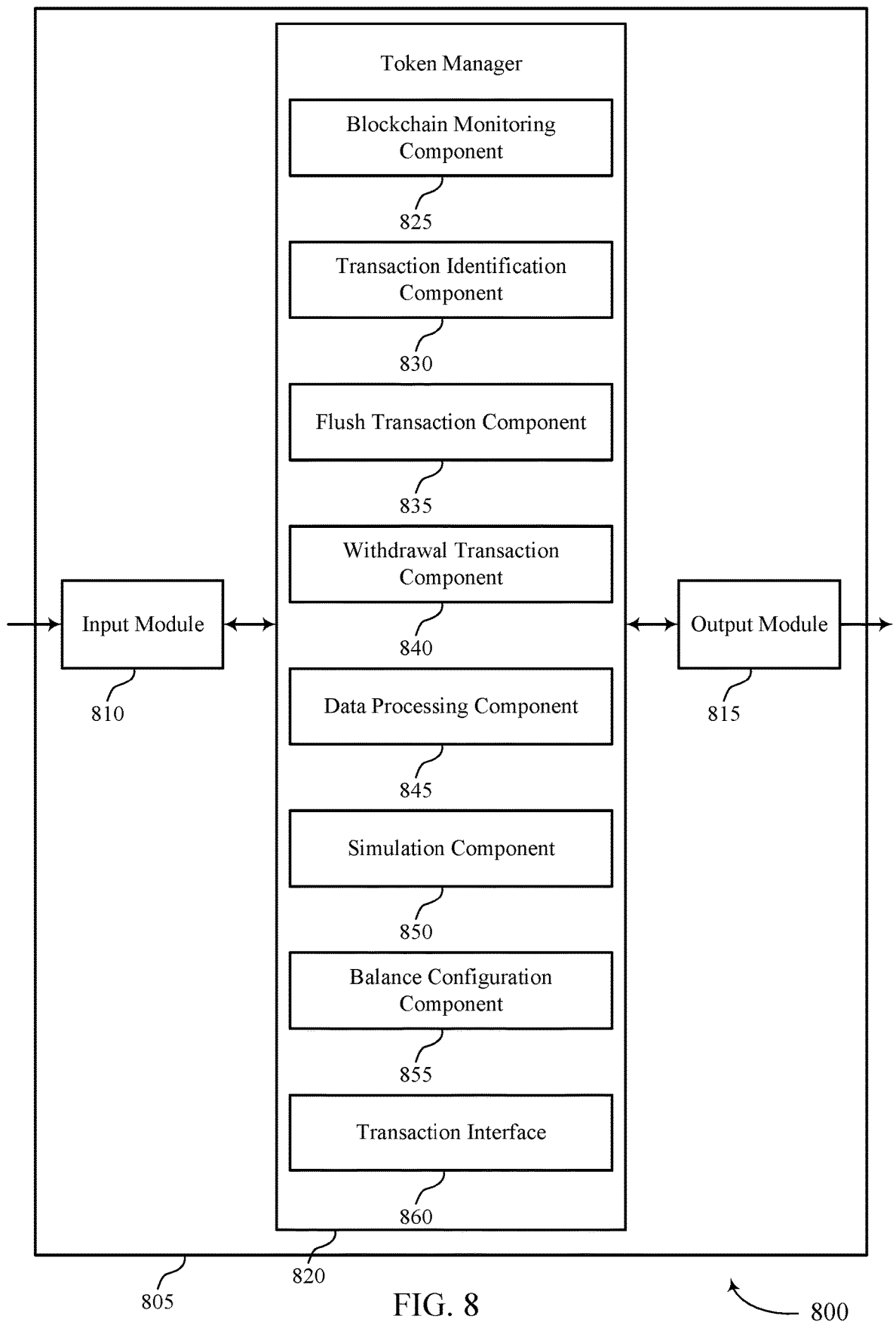
FIG. 8 illustrates a block diagram of an apparatus that supports token platform wallet orchestration in accordance with aspects of the present disclosure.

FIG. 8 illustrates a block diagram 800 of a system 805 that supports token platform wallet orchestration in accordance with aspects of the present disclosure. In some examples, the system 805 may be an example of aspects of one or more components described with reference to FIG. 1, such as a custodial token platform 110. The system 805 may include an input interface 810, an output interface 815, and a token manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the token manager 820 to support token platform wallet orchestration. In some cases, the input interface 810 may be a component of a network interface 1015 as described with reference to FIG. 10.

The output interface 815 may manage output signaling for the system 805. For example, the output interface 815 may receive signaling from other components of the system 805, such as the token manager 820, and may transmit such output signaling corresponding to (e.g., representative of or otherwise based on) such signaling to other systems or devices. In some cases, the output interface 815 may be a component of a network interface 1015 as described with reference to FIG. 10.

The token manager 820 may include a blockchain monitoring component 825, a transaction identification component 830, a flush transaction component 835, a withdrawal transaction component 840, a data processing component 845, a simulation component 850, a balance configuration component 855, a transaction interface 860, or any combination thereof. In some examples, the token manager 820, or various components thereof, may be configured to perform various operations (e.g., receiving, monitoring, transmitting) using or otherwise in cooperation with the input interface 810, the output interface 815, or both. For example, the token manager 820 may receive information from the input interface 810, send information to the output interface 815, or be integrated in combination with the input interface 810, the output interface 815, or both to receive information, transmit information, or perform various other operations as described herein.

The token manager 820 may support digital token management in accordance with examples as disclosed herein. The blockchain monitoring component 825 may be configured as or otherwise support a means for monitoring, via a blockchain, an inbound address controlled by a custodial token platform, the inbound address associated with a user of the custodial token platform and configured to receive a set of multiple different inbound transactions. The transaction identification component 830 may be configured as or otherwise support a means for identifying, based on the monitoring, one or more inbound transactions that indicate transfer of a crypto token from a first user address external to the custodial token platform to the inbound address controlled by the custodial token platform. The flush transaction component 835 may be configured as or otherwise support a means for broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The withdrawal transaction component 840 may be configured as or otherwise support a means for broadcasting a withdrawal transaction configured to transfer at least a portion of an amount of the crypto token attributed to the outbound address to a second user address external to the custodial token platform.

Additionally, or alternatively, the token manager 820 may support digital token management in accordance with examples as disclosed herein. The data processing component 845 may be configured as or otherwise support a means for processing a corpus of transaction data associated with a custodial token platform, the corpus of transaction data indicating movements of a crypto token between outbound addresses of the custodial token platform and a cold address managed by the custodial token platform. The simulation component 850 may be configured as or otherwise support a means for simulating, based on the corpus of transaction data, movements of the crypto token between the outbound addresses and the cold address using a set of multiple balance configurations that define one or more balance thresholds for the outbound addresses. The balance configuration component 855 may be configured as or otherwise support a means for determining, based on simulating the movements, a balance configuration for the outbound addresses and the cold address. The transaction interface 860 may be configured as or otherwise support a means for broadcasting one or more transactions that are configured to move the crypto token between the outbound addresses and the cold address based on the determined balance configuration.

Figure 9:
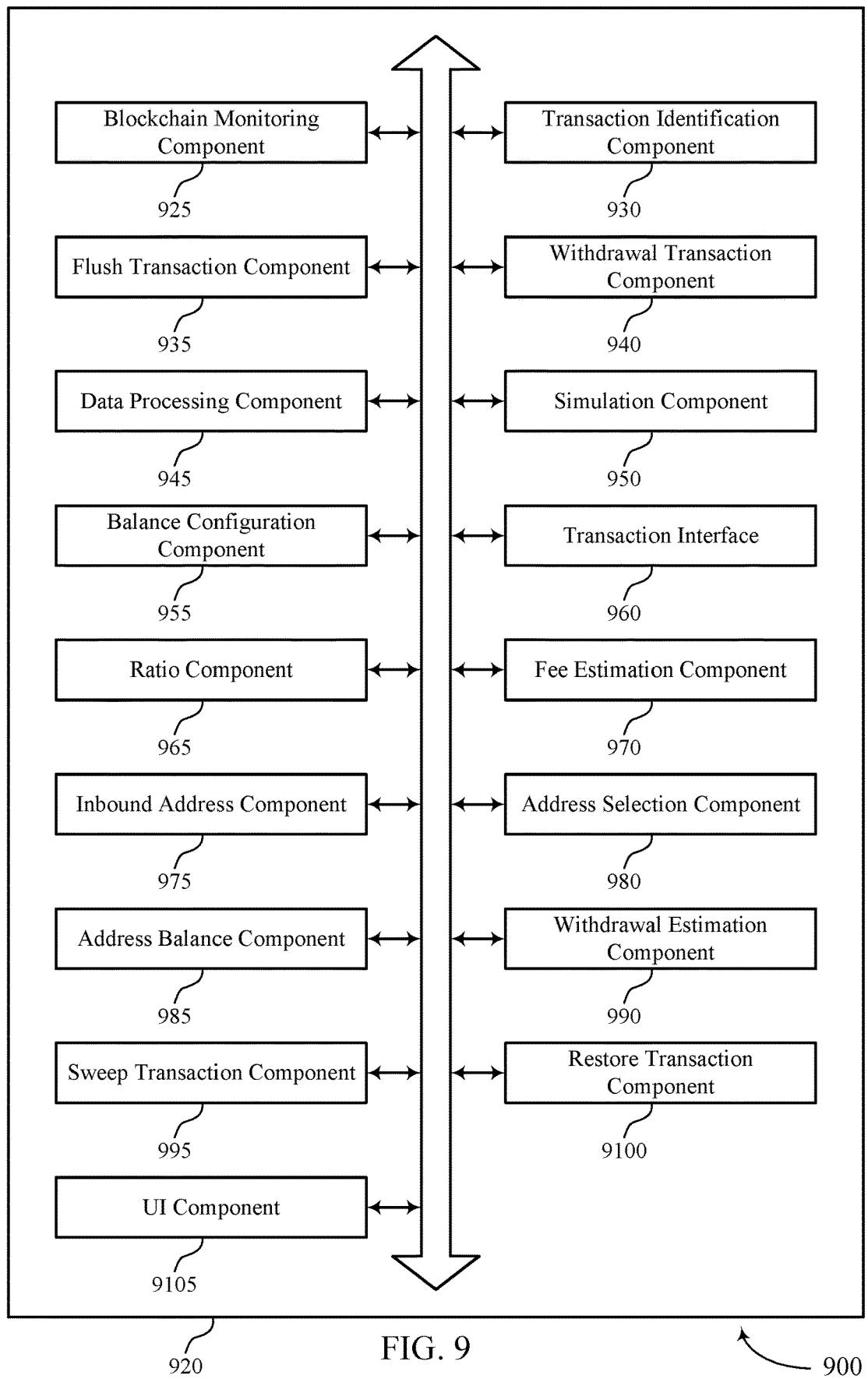
FIG. 9 illustrates a block diagram of a token manager that supports token platform wallet orchestration in accordance with aspects of the present disclosure.

FIG. 9 illustrates a block diagram 900 of a token manager 920 that supports token platform wallet orchestration in accordance with aspects of the present disclosure. The token manager 920 may be an example of aspects of a token manager 820, as described herein. The token manager 920, or various components thereof, may be an example of means for performing various aspects of token platform wallet orchestration as described herein. For example, the token manager 920 may include a blockchain monitoring component 925, a transaction identification component 930, a flush transaction component 935, a withdrawal transaction component 940, a data processing component 945, a simulation component 950, a balance configuration component 955, a transaction interface 960, a ratio component 965, a fee estimation component 970, an inbound address component 975, an address selection component 980, an address balance component 985, a withdrawal estimation component 990, a sweep transaction component 995, a restore transaction component 9100, a UI component 9105, or any combination thereof. Each of these components may communicate, directly or indirectly, with one another (e.g., via one or more buses, communications links, communications interfaces, or any combination thereof).

The token manager 920 may support digital token management in accordance with examples as disclosed herein. The blockchain monitoring component 925 may be configured as or otherwise support a means for monitoring, via a blockchain, an inbound address controlled by a custodial token platform, the inbound address associated with a user of the custodial token platform and configured to receive a set of multiple different inbound transactions. The transaction identification component 930 may be configured as or otherwise support a means for identifying, based on the monitoring, one or more inbound transactions that indicate transfer of a crypto token from a first user address external to the custodial token platform to the inbound address controlled by the custodial token platform. The flush transaction component 935 may be configured as or otherwise support a means for broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The withdrawal transaction component 940 may be configured as or otherwise support a means for broadcasting a withdrawal transaction configured to transfer at least a portion of an amount of the crypto token attributed to the outbound address to a second user address external to the custodial token platform.

In some examples, the blockchain monitoring component 925 may be configured as or otherwise support a means for monitoring amounts of the crypto token attributed to a set of multiple inbound addresses and outbound addresses associated with users of the custodial token platform. In some examples, the ratio component 965 may be configured as or otherwise support a means for generating the ratio based on the monitoring.

In some examples, the ratio component 965 may be configured as or otherwise support a means for updating the ratio based on the monitoring.

In some examples, the fee estimation component 970 may be configured as or otherwise support a means for monitoring a network fee estimation for the blockchain. In some examples, the fee estimation component 970 may be configured as or otherwise support a means for determining, based on the ratio, whether the network fee estimation is less than a threshold network fee.

In some examples, to support broadcasting the second transaction, the flush transaction component 935 may be configured as or otherwise support a means for broadcasting the second transaction in response to determining that the network fee estimation is less than the threshold network fee.

In some examples, to support broadcasting the second transaction, the fee estimation component 970 may be configured as or otherwise support a means for determining that the network fee estimation is greater than the threshold network fee. In some examples, to support broadcasting the second transaction, the flush transaction component 935 may be configured as or otherwise support a means for delaying the broadcasting of the second transaction until the network fee estimation is below the threshold network fee.

In some examples, the inbound address component 975 may be configured as or otherwise support a means for monitoring a total amount of the crypto token attributed to a set of multiple inbound addresses and a total amount of the crypto token attributed to a set of multiple outbound addresses. In some examples, the address selection component 980 may be configured as or otherwise support a means for selecting a quantity of inbound addresses of the set of multiple outbound addresses based on a respective amount attributed to each of the quantity of inbound addresses being greater than a threshold amount. In some examples, the flush transaction component 935 may be configured as or otherwise support a means for broadcasting the second transaction for each inbound address of the quantity of inbound addresses.

In some examples, to support selecting the quantity of inbound addresses, the blockchain monitoring component 925 may be configured as or otherwise support a means for determining whether each inbound address of a set of inbound addresses that include at least the threshold amount is associated with a respective third transaction that is pending on the blockchain. In some examples, to support selecting the quantity of inbound addresses, the address selection component 980 may be configured as or otherwise support a means for selecting the quantity of inbounded addresses in response to determining that each inbound address of the quantity of inbound addresses is not associated with the respective third transaction that is pending.

In some examples, the address balance component 985 may be configured as or otherwise support a means for generating an amount of the crypto token attributed to the inbound address based on an amount attributed to the inbound address via the blockchain and one or more pending transactions associated with the inbound address, where the ratio uses the generated amount of the crypto token attributed to the inbound address.

In some examples, the first user address and the second user address correspond to a same user.

Additionally, or alternatively, the token manager 920 may support digital token management in accordance with examples as disclosed herein. The data processing component 945 may be configured as or otherwise support a means for processing a corpus of transaction data associated with a custodial token platform, the corpus of transaction data indicating movements of a crypto token between outbound addresses of the custodial token platform and a cold address managed by the custodial token platform. The simulation component 950 may be configured as or otherwise support a means for simulating, based on the corpus of transaction data, movements of the crypto token between the outbound addresses and the cold address using a set of multiple balance configurations that define one or more balance thresholds for the outbound addresses. The balance configuration component 955 may be configured as or otherwise support a means for determining, based on simulating the movements, a balance configuration for the outbound addresses and the cold address. The transaction interface 960 may be configured as or otherwise support a means for broadcasting one or more transactions that are configured to move the crypto token between the outbound addresses and the cold address based on the determined balance configuration.

In some examples, to support simulating the movements of the crypto token, the withdrawal estimation component 990 may be configured as or otherwise support a means for monitoring estimated withdrawal times associated with the simulated movements, where the balance configuration is determined such that estimated withdrawal times are reduced for movements between the outbound addresses and external user addresses.

In some examples, to support simulating the movements of the crypto token, the sweep transaction component 995 may be configured as or otherwise support a means for generating a quantity of sweep transactions that correspond to movements of the crypto token from the outbound addresses to the cold address. In some examples, to support simulating the movements of the crypto token, the restore transaction component 9100 may be configured as or otherwise support a means for generating a quantity of restore transactions that correspond to movements of the crypto token from the cold address to the outbound addresses, where the balance configuration is determined based on the quantity of sweep transactions and the quantity of restore transactions.

In some examples, to support simulating the movements of the crypto token, the simulation component 950 may be configured as or otherwise support a means for comparing the simulated movements with movements corresponding to the corpus of transaction data, where the balance configuration is determined based on the comparing.

In some examples, to support simulating the movements of the crypto token, the simulation component 950 may be configured as or otherwise support a means for monitoring a ratio of total balance of outbound addresses to a balance of the cold address, where the balance configuration is determined such that a threshold ratio is not exceeded.

In some examples, the balance configuration indicates a minimum balance for the outbound addresses, a maximum balance for the outbound addresses, or a combination thereof.

In some examples, to support simulating the movements of the crypto token, the simulation component 950 may be configured as or otherwise support a means for simulating the movements using one or more constraints for the outbound addresses, where the balance configuration is determined based on simulating the movements using the one or more constraints.

In some examples, the one or more constraints include a maximum balance for the outbound addresses, a ratio of a minimum balance of the outbound addresses to the maximum balance for the outbound addresses, a maximum increase of the maximum balance for the outbound address over a duration, and a maximum decrease of the maximum balance for the outbound address over the duration.

In some examples, the UI component 9105 may be configured as or otherwise support a means for causing display, at a user interface, an indication of the determined balance configuration. In some examples, the UI component 9105 may be configured as or otherwise support a means for receiving, via the user interface, an indication of acceptance of the balance configuration, where the one or more transactions are broadcast based on receiving the indication of acceptance.

In some examples, the data processing component 945 may be configured as or otherwise support a means for processing the corpus of transaction data and simulating movements of a second crypto token between the outbound addresses and the cold address. In some examples, the balance configuration component 955 may be configured as or otherwise support a means for determining a second balance configuration for the outbound addresses and the cold address for the second crypto token, the second balance configuration different from the balance configuration for the crypto token.

Figure 10:
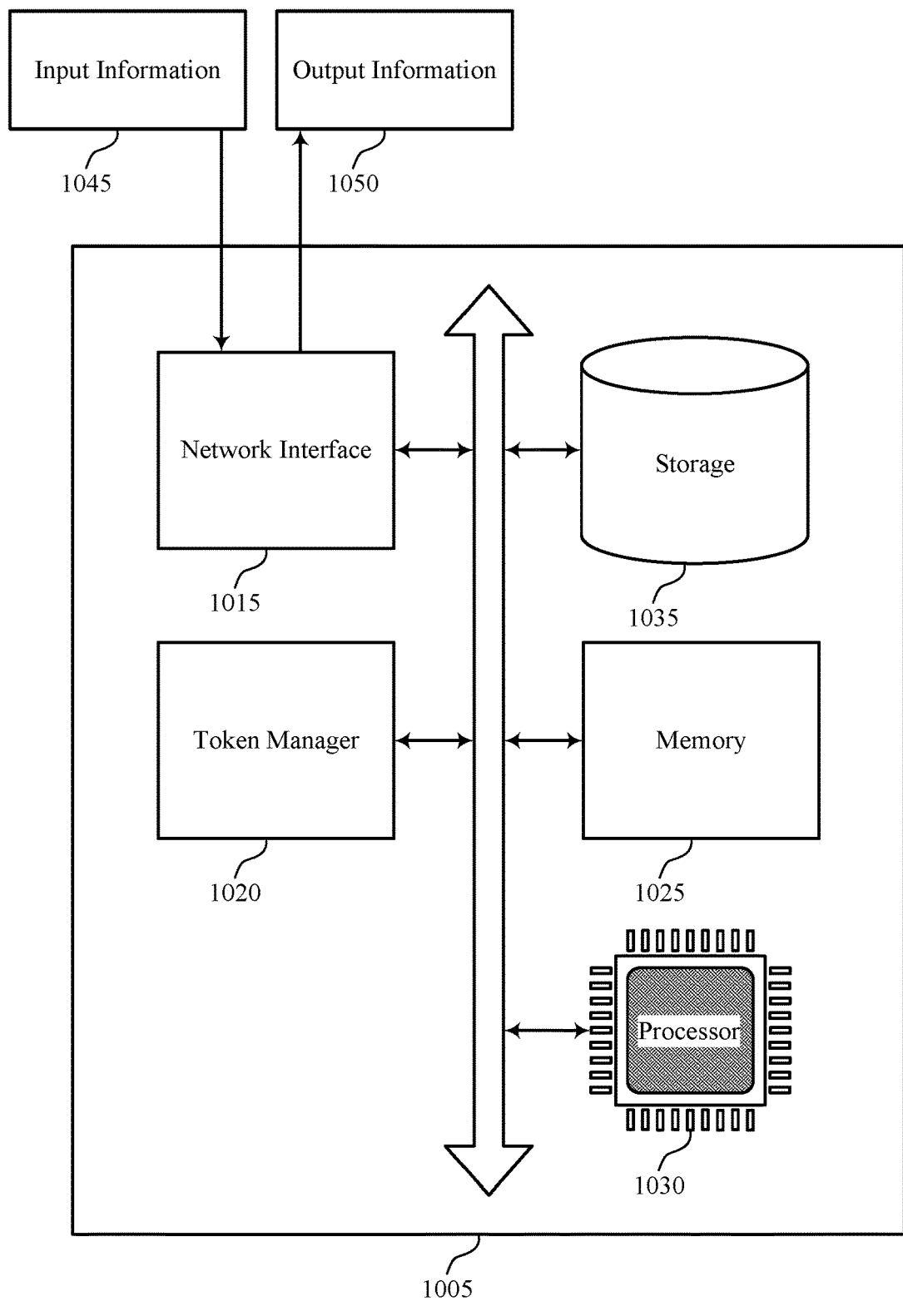
FIG. 10 illustrates a diagram of a system including a device that supports token platform wallet orchestration in accordance with aspects of the present disclosure.

FIG. 10 illustrates a diagram 1000 of a system 1005 that supports token platform wallet orchestration in accordance with aspects of the present disclosure. The system 1005 may be an example of or include the components of a system 805 as described herein. The system 1005 may include components for token management, such as a token manager 1020, network interface 1015, a memory 1025, a processor 1030, and a storage 1035. These components may be in electronic communication or otherwise coupled with each other (e.g., operatively, communicatively, functionally, electronically, electrically; via one or more buses, communications links, communications interfaces, or any combination thereof).

Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a custodial token platform 110.

The network interface 1015 may enable the system 1005 to exchange information (e.g., input information 1045, output information 1050, or both) with other systems or devices (not shown). For example, the network interface 1015 may enable the system 1005 to connect to a network (e.g., a network 135 as described herein). The network interface 1015 may include one or more wireless network interfaces, one or more wired network interfaces, or any combination thereof. In some examples, the network interface 1015 may be an example of may be an example of aspects of one or more components of the custodial asset exchange platform described with reference to FIG. 1.

Memory 1025 may include random access memory (RAM), read only memory (ROM), or both. The memory 1025 may store computer-readable, computer-executable software including instructions that, when executed, cause the processor 1030 to perform various functions described herein. In some cases, the memory 1025 may contain, among other things, a basic input/output system (BIOS), which may control basic hardware or software operation such as the interaction with peripheral components or devices. In some cases, the memory 1025 may be an example of aspects of one or more components of a custodial asset exchange platform described with reference to FIG. 1.

The processor 1030 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 1030 may be configured to execute computer-readable instructions stored in a memory 1025 to perform various functions (e.g., functions or tasks supporting token platform wallet orchestration). Though a single processor 1030 is depicted in the example of FIG. 10, it is to be understood that the system 1005 may include any quantity of one or more of processors 1030 and that a group of processors 1030 may collectively perform one or more functions ascribed herein to a processor, such as the processor 1030. In some cases, the processor 1030 may be an example of aspects of one or more components of a custodial asset exchange platform described with reference to FIG. 1.

Storage 1035 may be configured to store data that is generated, processed, stored, or otherwise used by the system 1005. In some cases, the storage 1035 may include one or more hard disc drives (HDDs), one or more solid state drives (SSDs), or both. In some examples, the storage 1035 may be an example of a single database, a distributed database, multiple distributed databases, a data store, a data lake, or an emergency backup database. In some examples, the storage 1035 may be an example of one or more components of a custodial asset exchange platform described with reference to FIG. 1

The token manager 1020 may support digital token management in accordance with examples as disclosed herein. For example, the token manager 1020 may be configured as or otherwise support a means for monitoring, via a blockchain, an inbound address controlled by a custodial token platform, the inbound address associated with a user of the custodial token platform and configured to receive a set of multiple different inbound transactions. The token manager 1020 may be configured as or otherwise support a means for identifying, based at least in part on the monitoring, one or more inbound transactions that indicate transfer of a crypto token from a first user address external to the custodial token platform to the inbound address controlled by the custodial token platform. The token manager 1020 may be configured as or otherwise support a means for broadcasting, based at least in part on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The token manager 1020 may be configured as or otherwise support a means for broadcasting a withdrawal transaction configured to transfer at least a portion of an amount of the crypto token attributed to the outbound address to a second user address external to the custodial token platform.

Additionally, or alternatively, the token manager 1020 may support digital token management in accordance with examples as disclosed herein. For example, the token manager 1020 may be configured as or otherwise support a means for processing a corpus of transaction data associated with a custodial token platform, the corpus of transaction data indicating movements of a crypto token between outbound addresses of the custodial token platform and a cold address managed by the custodial token platform. The token manager 1020 may be configured as or otherwise support a means for simulating, based on the corpus of transaction data, movements of the crypto token between the outbound addresses and the cold address using a set of multiple balance configurations that define one or more balance thresholds for the outbound addresses. The token manager 1020 may be configured as or otherwise support a means for determining, based on simulating the movements, a balance configuration for the outbound addresses and the cold address. The token manager 1020 may be configured as or otherwise support a means for broadcasting one or more transactions that are configured to move the crypto token between the outbound addresses and the cold address based on the determined balance configuration.

Figure 11:
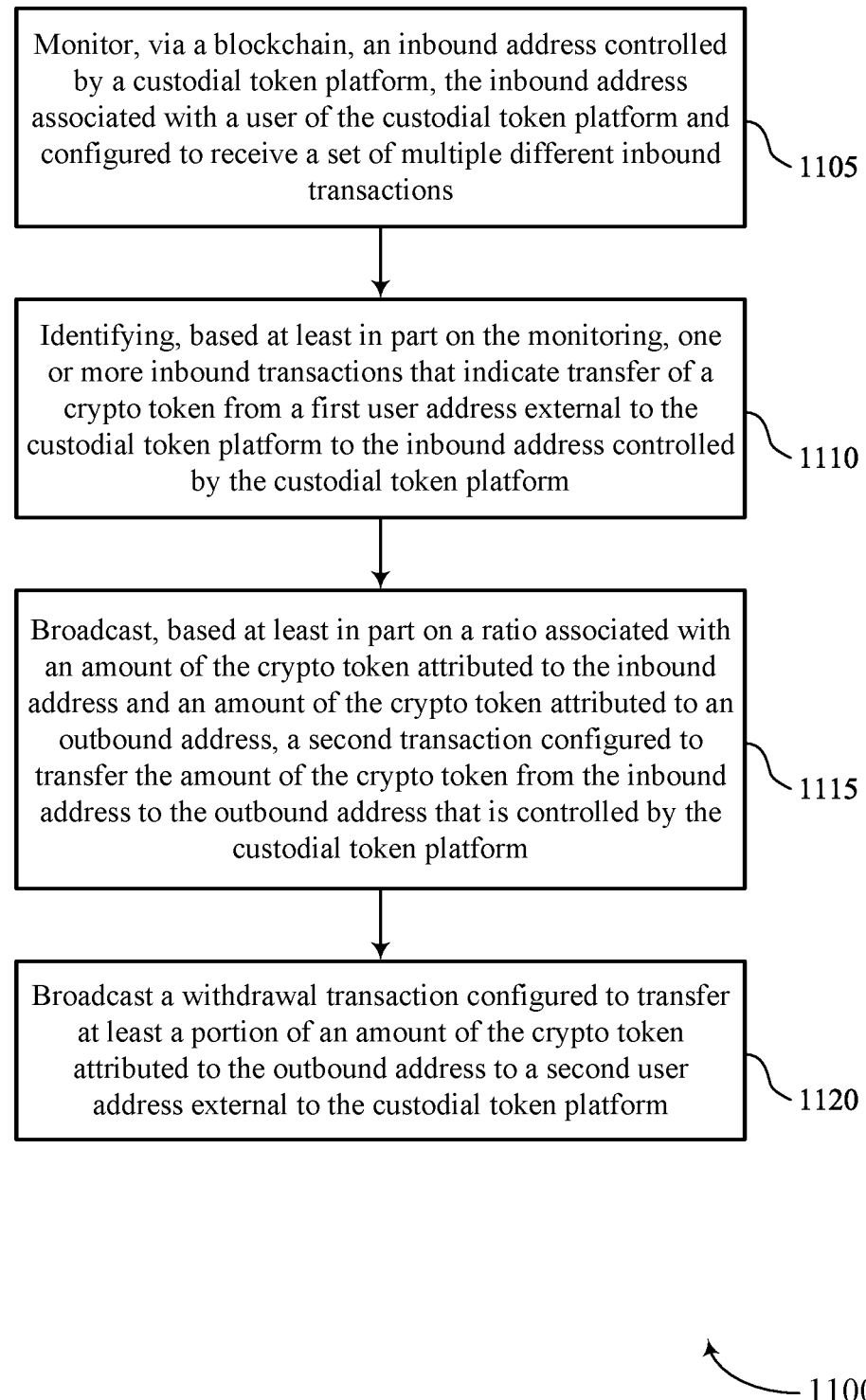
FIGS. 11 through 16 illustrate flowcharts showing methods that support token platform wallet orchestration in accordance with aspects of the present disclosure.

FIG. 11 illustrates a flowchart showing a method 1100 that supports token platform wallet orchestration in accordance with aspects of the present disclosure. The operations of the method 1100 may be implemented by a custodial token platform or its components as described herein. For example, the operations of the method 1100 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include monitoring, via a blockchain, an inbound address controlled by a custodial token platform, the inbound address associated with a user of the custodial token platform and configured to receive a set of multiple different inbound transactions. The operations of 1105 may be performed in accordance with examples as disclosed herein. In some examples, aspects of the operations of 1105 may be performed by a blockchain monitoring component 925 as described with reference to FIG. 9.

At 1110, the method may include identifying, based on the monitoring, one or more inbound transactions that indicate transfer of a crypto token from a first user address external to the custodial token platform to the inbound address controlled by the custodial token platform. The operations of 1110 may be performed in accordance with examples as disclosed herein. In some examples, aspects of the operations of 1110 may be performed by a transaction identification component 930 as described with reference to FIG. 9.

At 1115, the method may include broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The operations of 1115 may be performed in accordance with examples as disclosed herein. In some examples, aspects of the operations of 1115 may be performed by a flush transaction component 935 as described with reference to FIG. 9.

At 1120, the method may include broadcasting a withdrawal transaction configured to transfer at least a portion of an amount of the crypto token attributed to the outbound address to a second user address external to the custodial token platform. The operations of 1120 may be performed in accordance with examples as disclosed herein. In some examples, aspects of the operations of 1120 may be performed by a withdrawal transaction component 940 as described with reference to FIG. 9.

Figure 12:
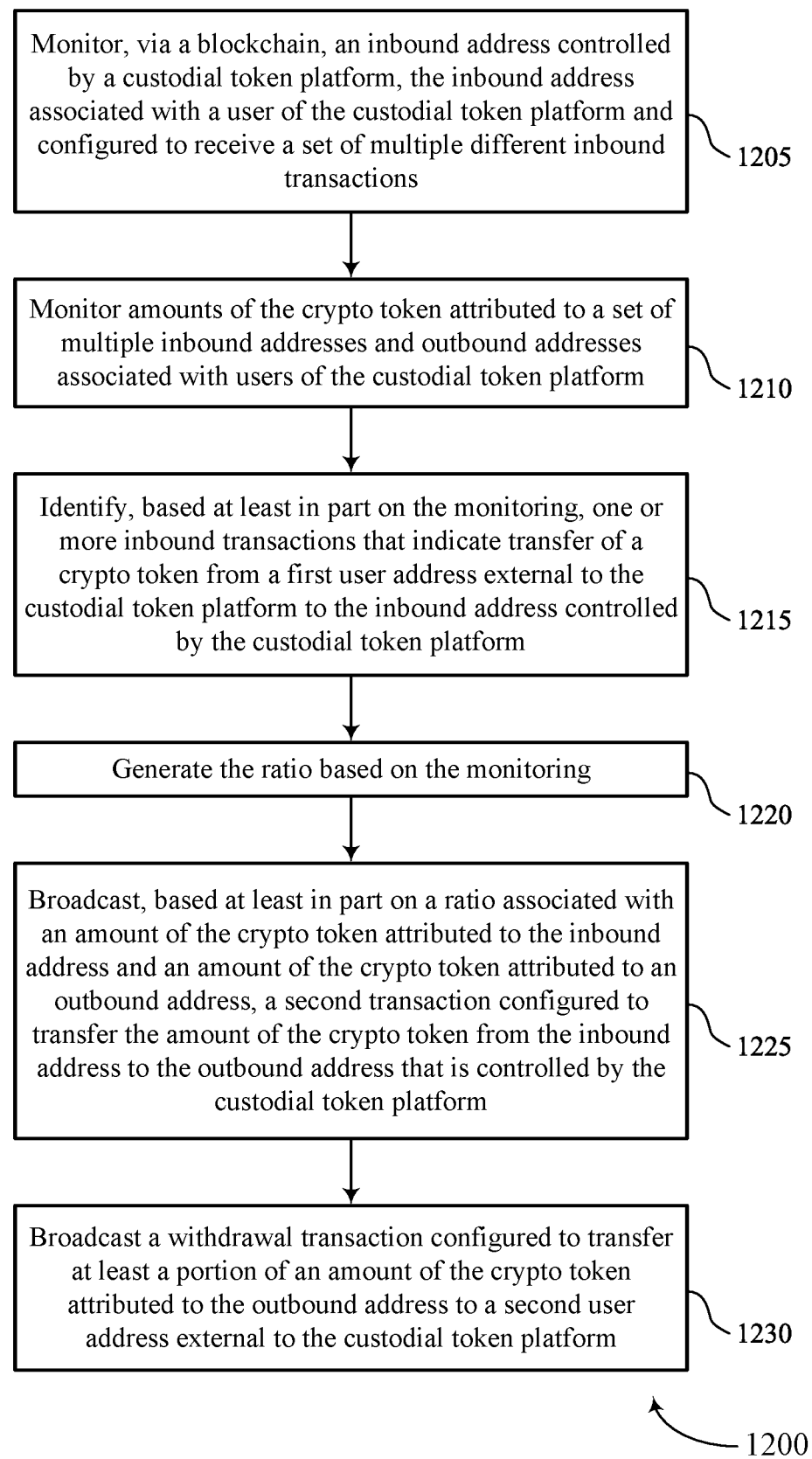

FIG. 12 illustrates a flowchart showing a method 1200 that supports token platform wallet orchestration in accordance with aspects of the present disclosure. The operations of the method 1200 may be implemented by a custodial token platform or its components as described herein. For example, the operations of the method 1200 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include monitoring, via a blockchain, an inbound address controlled by a custodial token platform, the inbound address associated with a user of the custodial token platform and configured to receive a set of multiple different inbound transactions. The operations of 1205 may be performed in accordance with examples as disclosed herein. In some examples, aspects of the operations of 1205 may be performed by a blockchain monitoring component 925 as described with reference to FIG. 9.

At 1210, the method may include monitoring amounts of the crypto token attributed to a set of multiple inbound addresses and outbound addresses associated with users of the custodial token platform. The operations of 1210 may be performed in accordance with examples as disclosed herein. In some examples, aspects of the operations of 1210 may be performed by a blockchain monitoring component 925 as described with reference to FIG. 9.

At 1215, the method may include identifying, based on the monitoring, one or more inbound transactions that indicate transfer of a crypto token from a first user address external to the custodial token platform to the inbound address controlled by the custodial token platform. The operations of 1215 may be performed in accordance with examples as disclosed herein. In some examples, aspects of the operations of 1215 may be performed by a transaction identification component 930 as described with reference to FIG. 9.

At 1220, the method may include generating the ratio based on the monitoring. The operations of 1220 may be performed in accordance with examples as disclosed herein. In some examples, aspects of the operations of 1220 may be performed by a ratio component 965 as described with reference to FIG. 9.

At 1225, the method may include broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The operations of 1225 may be performed in accordance with examples as disclosed herein. In some examples, aspects of the operations of 1225 may be performed by a flush transaction component 935 as described with reference to FIG. 9.

At 1230, the method may include broadcasting a withdrawal transaction configured to transfer at least a portion of an amount of the crypto token attributed to the outbound address to a second user address external to the custodial token platform. The operations of 1230 may be performed in accordance with examples as disclosed herein. In some examples, aspects of the operations of 1230 may be performed by a withdrawal transaction component 940 as described with reference to FIG. 9.

Figure 13:
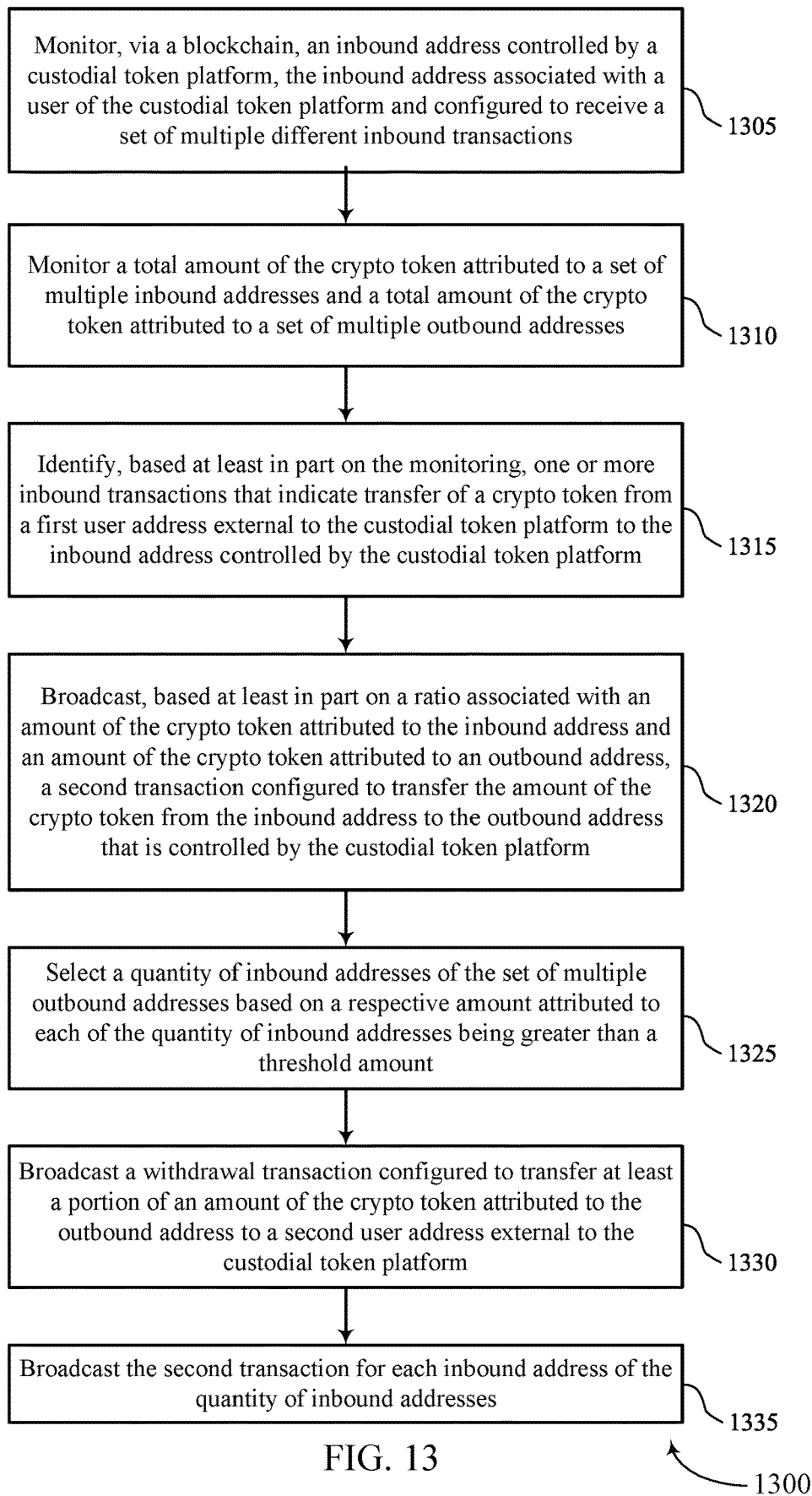

FIG. 13 illustrates a flowchart showing a method 1300 that supports token platform wallet orchestration in accordance with aspects of the present disclosure. The operations of the method 1300 may be implemented by a custodial token platform or its components as described herein. For example, the operations of the method 1300 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include monitoring, via a blockchain, an inbound address controlled by a custodial token platform, the inbound address associated with a user of the custodial token platform and configured to receive a set of multiple different inbound transactions. The operations of 1305 may be performed in accordance with examples as disclosed herein. In some examples, aspects of the operations of 1305 may be performed by a blockchain monitoring component 925 as described with reference to FIG. 9.

At 1310, the method may include monitoring a total amount of the crypto token attributed to a set of multiple inbound addresses and a total amount of the crypto token attributed to a set of multiple outbound addresses. The operations of 1310 may be performed in accordance with examples as disclosed herein. In some examples, aspects of the operations of 1310 may be performed by an inbound address component 975 as described with reference to FIG. 9.

At 1315, the method may include identifying, based on the monitoring, one or more inbound transactions that indicate transfer of a crypto token from a first user address external to the custodial token platform to the inbound address controlled by the custodial token platform. The operations of 1315 may be performed in accordance with examples as disclosed herein. In some examples, aspects of the operations of 1315 may be performed by a transaction identification component 930 as described with reference to FIG. 9.

At 1320, the method may include broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform. The operations of 1320 may be performed in accordance with examples as disclosed herein. In some examples, aspects of the operations of 1320 may be performed by a flush transaction component 935 as described with reference to FIG. 9.

At 1325, the method may include selecting a quantity of inbound addresses of the set of multiple outbound addresses based on a respective amount attributed to each of the quantity of inbound addresses being greater than a threshold amount. The operations of 1325 may be performed in accordance with examples as disclosed herein. In some examples, aspects of the operations of 1325 may be performed by an address selection component 980 as described with reference to FIG. 9.

At 1330, the method may include broadcasting a withdrawal transaction configured to transfer at least a portion of an amount of the crypto token attributed to the outbound address to a second user address external to the custodial token platform. The operations of 1330 may be performed in accordance with examples as disclosed herein. In some examples, aspects of the operations of 1330 may be performed by a withdrawal transaction component 940 as described with reference to FIG. 9.

At 1335, the method may include broadcasting the second transaction for each inbound address of the quantity of inbound addresses. The operations of 1335 may be performed in accordance with examples as disclosed herein. In some examples, aspects of the operations of 1335 may be performed by a flush transaction component 935 as described with reference to FIG. 9.

Figure 14:
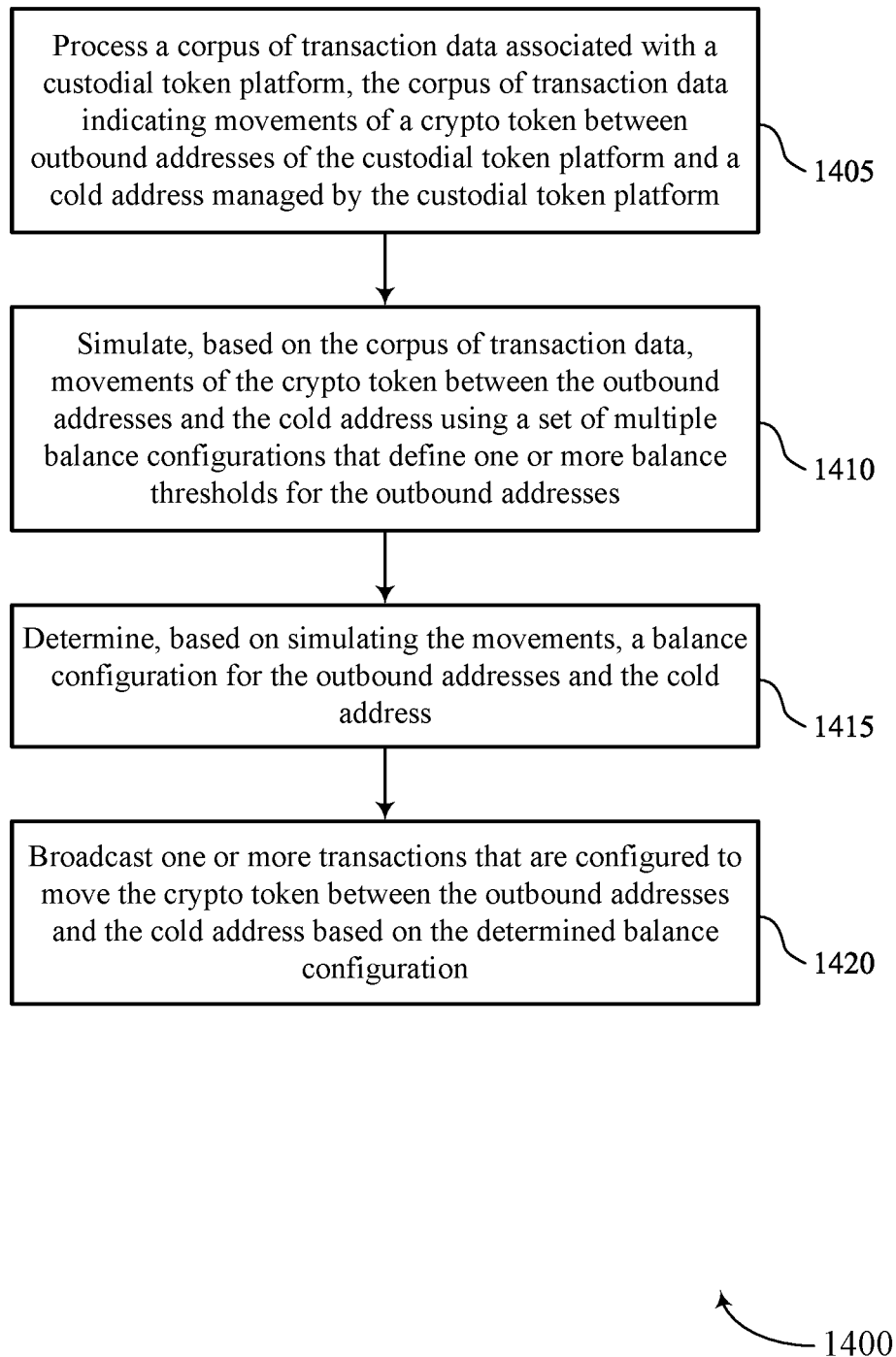

FIG. 14 illustrates a flowchart showing a method 1400 that supports token platform wallet orchestration in accordance with aspects of the present disclosure. The operations of the method 1400 may be implemented by a custodial token platform or its components as described herein. For example, the operations of the method 1400 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1405, the method may include processing a corpus of transaction data associated with a custodial token platform, the corpus of transaction data indicating movements of a crypto token between outbound addresses of the custodial token platform and a cold address managed by the custodial token platform. The operations of 1405 may be performed in accordance with examples as disclosed herein. In some examples, aspects of the operations of 1405 may be performed by a data processing component 945 as described with reference to FIG. 9.

At 1410, the method may include simulating, based on the corpus of transaction data, movements of the crypto token between the outbound addresses and the cold address using a set of multiple balance configurations that define one or more balance thresholds for the outbound addresses. The operations of 1410 may be performed in accordance with examples as disclosed herein. In some examples, aspects of the operations of 1410 may be performed by a simulation component 950 as described with reference to FIG. 9.

At 1415, the method may include determining, based on simulating the movements, a balance configuration for the outbound addresses and the cold address. The operations of 1415 may be performed in accordance with examples as disclosed herein. In some examples, aspects of the operations of 1415 may be performed by a balance configuration component 955 as described with reference to FIG. 9.

At 1420, the method may include broadcasting one or more transactions that are configured to move the crypto token between the outbound addresses and the cold address based on the determined balance configuration. The operations of 1420 may be performed in accordance with examples as disclosed herein. In some examples, aspects of the operations of 1420 may be performed by a transaction interface 960 as described with reference to FIG. 9.

Figure 15:
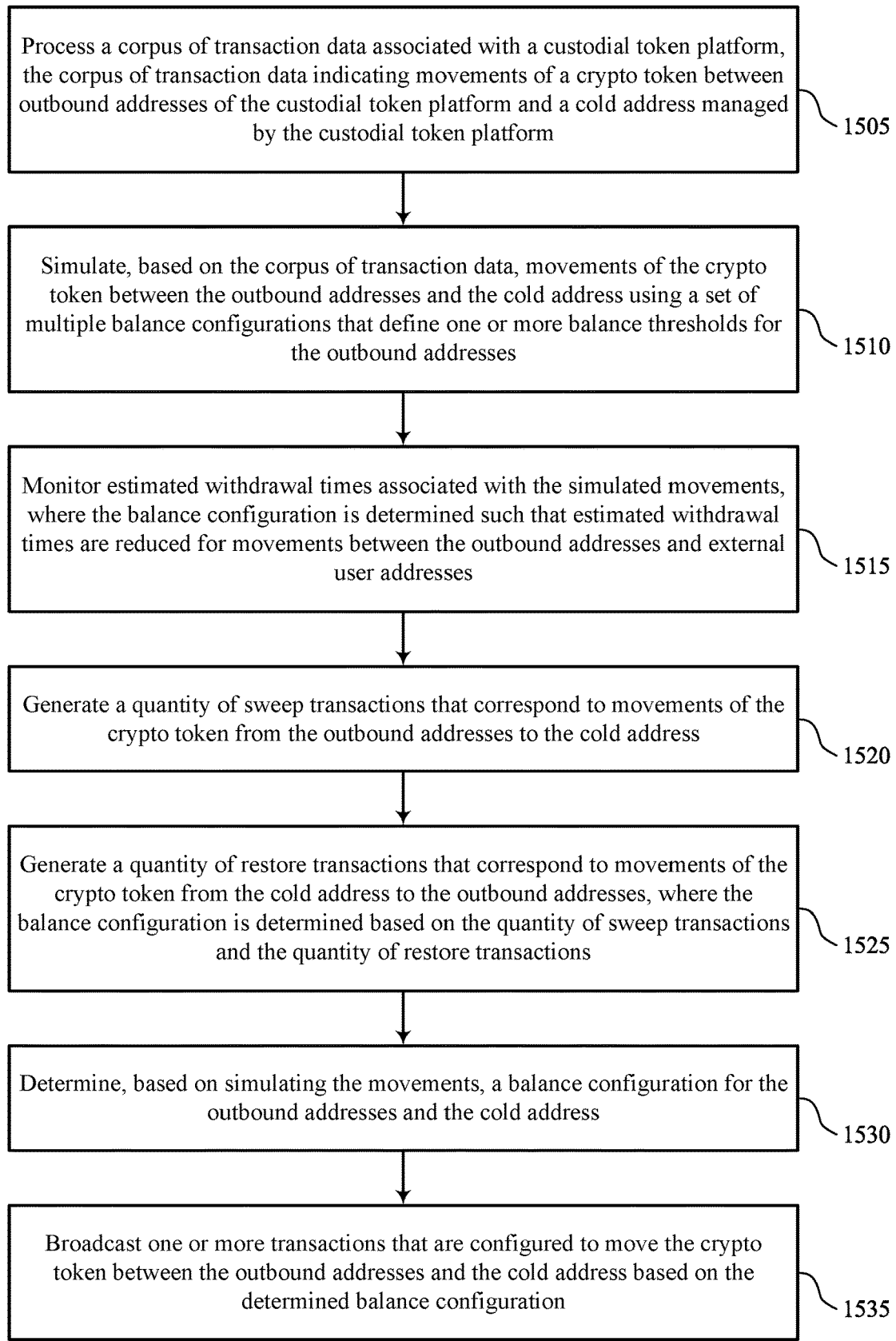

FIG. 15 illustrates a flowchart showing a method 1500 that supports token platform wallet orchestration in accordance with aspects of the present disclosure. The operations of the method 1500 may be implemented by a custodial token platform or its components as described herein. For example, the operations of the method 1500 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1505, the method may include processing a corpus of transaction data associated with a custodial token platform, the corpus of transaction data indicating movements of a crypto token between outbound addresses of the custodial token platform and a cold address managed by the custodial token platform. The operations of 1505 may be performed in accordance with examples as disclosed herein. In some examples, aspects of the operations of 1505 may be performed by a data processing component 945 as described with reference to FIG. 9.

At 1510, the method may include simulating, based on the corpus of transaction data, movements of the crypto token between the outbound addresses and the cold address using a set of multiple balance configurations that define one or more balance thresholds for the outbound addresses. The operations of 1510 may be performed in accordance with examples as disclosed herein. In some examples, aspects of the operations of 1510 may be performed by a simulation component 950 as described with reference to FIG. 9.

At 1515, the method may include monitoring estimated withdrawal times associated with the simulated movements, where the balance configuration is determined such that estimated withdrawal times are reduced for movements between the outbound addresses and external user addresses. The operations of 1515 may be performed in accordance with examples as disclosed herein. In some examples, aspects of the operations of 1515 may be performed by a withdrawal estimation component 990 as described with reference to FIG. 9.

At 1520, the method may include generating a quantity of sweep transactions that correspond to movements of the crypto token from the outbound addresses to the cold address. The operations of 1520 may be performed in accordance with examples as disclosed herein. In some examples, aspects of the operations of 1520 may be performed by a sweep transaction component 995 as described with reference to FIG. 9.

At 1525, the method may include generating a quantity of restore transactions that correspond to movements of the crypto token from the cold address to the outbound addresses, where the balance configuration is determined based on the quantity of sweep transactions and the quantity of restore transactions. The operations of 1525 may be performed in accordance with examples as disclosed herein. In some examples, aspects of the operations of 1525 may be performed by a restore transaction component 9100 as described with reference to FIG. 9.

At 1530, the method may include determining, based on simulating the movements, a balance configuration for the outbound addresses and the cold address. The operations of 1530 may be performed in accordance with examples as disclosed herein. In some examples, aspects of the operations of 1530 may be performed by a balance configuration component 955 as described with reference to FIG. 9.

At 1535, the method may include broadcasting one or more transactions that are configured to move the crypto token between the outbound addresses and the cold address based on the determined balance configuration. The operations of 1535 may be performed in accordance with examples as disclosed herein. In some examples, aspects of the operations of 1535 may be performed by a transaction interface 960 as described with reference to FIG. 9.

Figure 16:
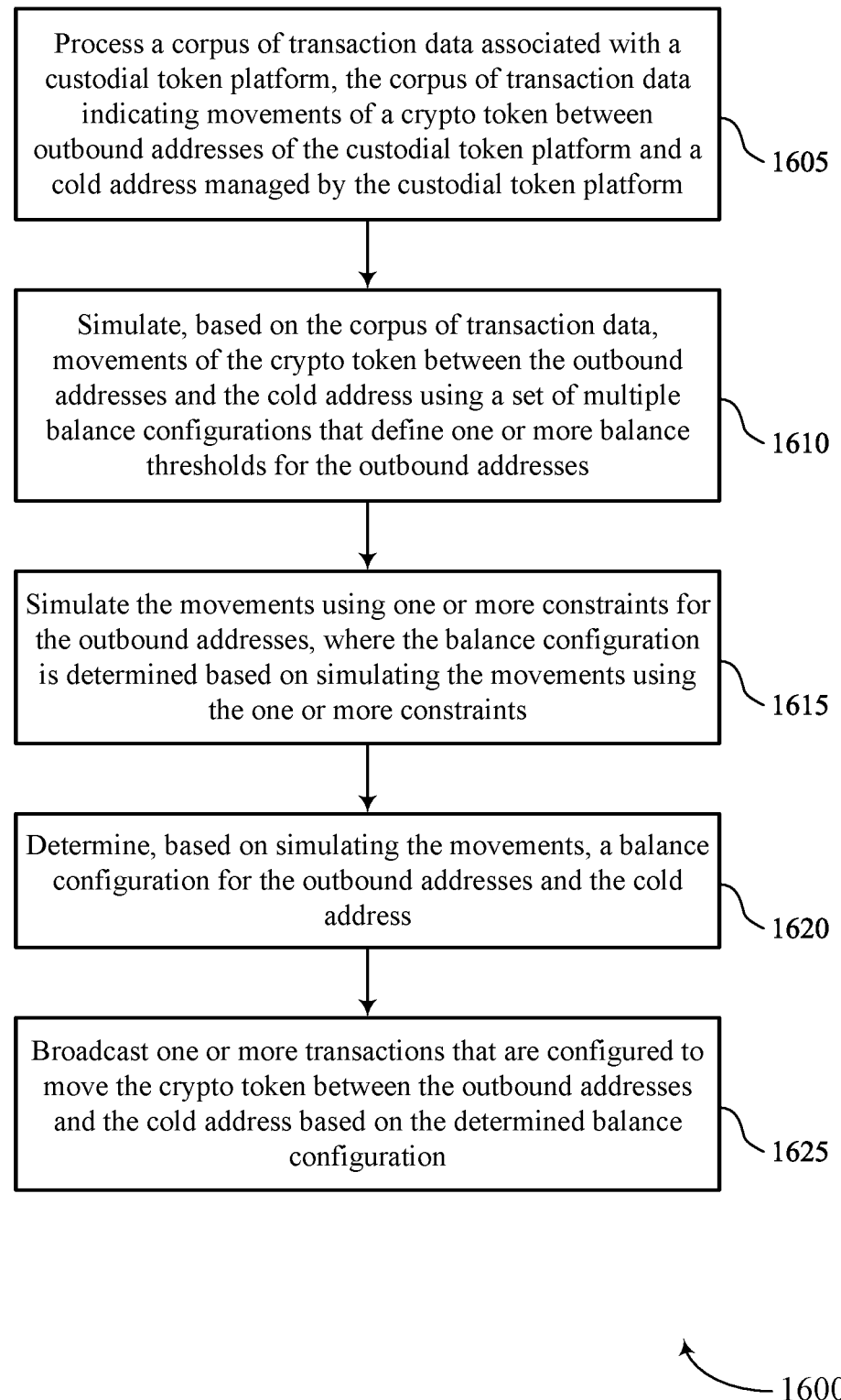

FIG. 16 illustrates a flowchart showing a method 1600 that supports token platform wallet orchestration in accordance with aspects of the present disclosure. The operations of the method 1600 may be implemented by a custodial token platform or its components as described herein. For example, the operations of the method 1600 may be performed by a custodial token platform as described with reference to FIGS. 1 through 10. In some examples, a custodial token platform may execute a set of instructions to control the functional elements of the custodial token platform to perform the described functions. Additionally, or alternatively, the custodial token platform may perform aspects of the described functions using special-purpose hardware.

At 1605, the method may include processing a corpus of transaction data associated with a custodial token platform, the corpus of transaction data indicating movements of a crypto token between outbound addresses of the custodial token platform and a cold address managed by the custodial token platform. The operations of 1605 may be performed in accordance with examples as disclosed herein. In some examples, aspects of the operations of 1605 may be performed by a data processing component 945 as described with reference to FIG. 9.

At 1610, the method may include simulating, based on the corpus of transaction data, movements of the crypto token between the outbound addresses and the cold address using a set of multiple balance configurations that define one or more balance thresholds for the outbound addresses. The operations of 1610 may be performed in accordance with examples as disclosed herein. In some examples, aspects of the operations of 1610 may be performed by a simulation component 950 as described with reference to FIG. 9.

At 1615, the method may include simulating the movements using one or more constraints for the outbound addresses, where the balance configuration is determined based on simulating the movements using the one or more constraints. The operations of 1615 may be performed in accordance with examples as disclosed herein. In some examples, aspects of the operations of 1615 may be performed by a simulation component 950 as described with reference to FIG. 9.

At 1620, the method may include determining, based on simulating the movements, a balance configuration for the outbound addresses and the cold address. The operations of 1620 may be performed in accordance with examples as disclosed herein. In some examples, aspects of the operations of 1620 may be performed by a balance configuration component 955 as described with reference to FIG. 9.

At 1625, the method may include broadcasting one or more transactions that are configured to move the crypto token between the outbound addresses and the cold address based on the determined balance configuration. The operations of 1625 may be performed in accordance with examples as disclosed herein. In some examples, aspects of the operations of 1625 may be performed by a transaction interface 960 as described with reference to FIG. 9.

A method for digital token management is described. The method may include monitoring, via a blockchain, an inbound address controlled by a custodial token platform, the inbound address associated with a user of the custodial token platform and configured to receive a set of multiple different inbound transactions, identifying, based on the monitoring, one or more inbound transactions that indicate transfer of a crypto token from a first user address external to the custodial token platform to the inbound address controlled by the custodial token platform, broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform, and broadcasting a withdrawal transaction configured to transfer at least a portion of an amount of the crypto token attributed to the outbound address to a second user address external to the custodial token platform.

An apparatus for digital token management is described. The apparatus may include a processor, memory coupled with the processor, and instructions stored in the memory. The instructions may be executable by the processor to cause the apparatus to monitor, via a blockchain, an inbound address controlled by a custodial token platform, the inbound address associated with a user of the custodial token platform and configured to receive a set of multiple different inbound transactions, identifying, based at least in part on the monitoring, one or more inbound transactions that indicate transfer of a crypto token from a first user address external to the custodial token platform to the inbound address controlled by the custodial token platform, broadcasting, based at least in part on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform, and broadcast a withdrawal transaction configured to transfer at least a portion of an amount of the crypto token attributed to the outbound address to a second user address external to the custodial token platform.

Another apparatus for digital token management is described. The apparatus may include means for monitoring, via a blockchain, an inbound address controlled by a custodial token platform, the inbound address associated with a user of the custodial token platform and configured to receive a set of multiple different inbound transactions, means for identifying, based on the monitoring, one or more inbound transactions that indicate transfer of a crypto token from a first user address external to the custodial token platform to the inbound address controlled by the custodial token platform, means for broadcasting, based on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform, and means for broadcasting a withdrawal transaction configured to transfer at least a portion of an amount of the crypto token attributed to the outbound address to a second user address external to the custodial token platform.

A non-transitory computer-readable medium storing code for digital token management is described. The code may include instructions executable by a processor to monitor, via a blockchain, an inbound address controlled by a custodial token platform, the inbound address associated with a user of the custodial token platform and configured to receive a set of multiple different inbound transactions, identifying, based at least in part on the monitoring, one or more inbound transactions that indicate transfer of a crypto token from a first user address external to the custodial token platform to the inbound address controlled by the custodial token platform, broadcasting, based at least in part on a ratio associated with an amount of the crypto token attributed to the inbound address and an amount of the crypto token attributed to an outbound address, a second transaction configured to transfer the amount of the crypto token from the inbound address to the outbound address that is controlled by the custodial token platform, and broadcast a withdrawal transaction configured to transfer at least a portion of an amount of the crypto token attributed to the outbound address to a second user address external to the custodial token platform.

Some examples of the method, apparatuses, and non-transitory computer-readable medium described herein may further include operations, features, means, or instructions for monitoring amounts of the crypto token attributed to a set of multiple inbound addresses and outbound addresses associated with users of the custodial token platform and generating the ratio based on the monitoring.

Some examples of the method, apparatuses, and non-transitory computer-readable medium described herein may further include operations, features, means, or instructions for updating the ratio based on the monitoring.

Some examples of the method, apparatuses, and non-transitory computer-readable medium described herein may further include operations, features, means, or instructions for monitoring a network fee estimation for the blockchain and determining, based on the ratio, whether the network fee estimation may be less than a threshold network fee.

In some examples of the method, apparatuses, and non-transitory computer-readable medium described herein, broadcasting the second transaction may include operations, features, means, or instructions for broadcasting the second transaction in response to determining that the network fee estimation may be less than the threshold network fee.

In some examples of the method, apparatuses, and non-transitory computer-readable medium described herein, broadcasting the second transaction may include operations, features, means, or instructions for determining that the network fee estimation may be greater than the threshold network fee and delaying the broadcasting of the second transaction until the network fee estimation may be below the threshold network fee.

Some examples of the method, apparatuses, and non-transitory computer-readable medium described herein may further include operations, features, means, or instructions for monitoring a total amount of the crypto token attributed to a set of multiple inbound addresses and a total amount of the crypto token attributed to a set of multiple outbound addresses, selecting a quantity of inbound addresses of the set of multiple outbound addresses based on a respective amount attributed to each of the quantity of inbound addresses being greater than a threshold amount, and broadcasting the second transaction for each inbound address of the quantity of inbound addresses.

In some examples of the method, apparatuses, and non-transitory computer-readable medium described herein, selecting the quantity of inbound addresses may include operations, features, means, or instructions for determining whether each inbound address of a set of inbound addresses that include at least the threshold amount may be associated with a respective third transaction that may be pending on the blockchain and selecting the quantity of inbounded addresses in response to determining that each inbound address of the quantity of inbound addresses may be not associated with the respective third transaction that may be pending.

Some examples of the method, apparatuses, and non-transitory computer-readable medium described herein may further include operations, features, means, or instructions for generating an amount of the crypto token attributed to the inbound address based on an amount attributed to the inbound address via the blockchain and one or more pending transactions associated with the inbound address, where the ratio uses the generated amount of the crypto token attributed to the inbound address.

In some examples of the method, apparatuses, and non-transitory computer-readable medium described herein, the first user address and the second user address correspond to a same user.

A method for digital token management is described. The method may include processing a corpus of transaction data associated with a custodial token platform, the corpus of transaction data indicating movements of a crypto token between outbound addresses of the custodial token platform and a cold address managed by the custodial token platform, simulating, based on the corpus of transaction data, movements of the crypto token between the outbound addresses and the cold address using a set of multiple balance configurations that define one or more balance thresholds for the outbound addresses, determining, based on simulating the movements, a balance configuration for the outbound addresses and the cold address, and broadcasting one or more transactions that are configured to move the crypto token between the outbound addresses and the cold address based on the determined balance configuration.

An apparatus for digital token management is described. The apparatus may include a processor, memory coupled with the processor, and instructions stored in the memory. The instructions may be executable by the processor to cause the apparatus to process a corpus of transaction data associated with a custodial token platform, the corpus of transaction data indicating movements of a crypto token between outbound addresses of the custodial token platform and a cold address managed by the custodial token platform, simulate, based on the corpus of transaction data, movements of the crypto token between the outbound addresses and the cold address using a set of multiple balance configurations that define one or more balance thresholds for the outbound addresses, determine, based on simulating the movements, a balance configuration for the outbound addresses and the cold address, and broadcast one or more transactions that are configured to move the crypto token between the outbound addresses and the cold address based on the determined balance configuration.

Another apparatus for digital token management is described. The apparatus may include means for processing a corpus of transaction data associated with a custodial token platform, the corpus of transaction data indicating movements of a crypto token between outbound addresses of the custodial token platform and a cold address managed by the custodial token platform, means for simulating, based on the corpus of transaction data, movements of the crypto token between the outbound addresses and the cold address using a set of multiple balance configurations that define one or more balance thresholds for the outbound addresses, means for determining, based on simulating the movements, a balance configuration for the outbound addresses and the cold address, and means for broadcasting one or more transactions that are configured to move the crypto token between the outbound addresses and the cold address based on the determined balance configuration.

A non-transitory computer-readable medium storing code for digital token management is described. The code may include instructions executable by a processor to process a corpus of transaction data associated with a custodial token platform, the corpus of transaction data indicating movements of a crypto token between outbound addresses of the custodial token platform and a cold address managed by the custodial token platform, simulate, based on the corpus of transaction data, movements of the crypto token between the outbound addresses and the cold address using a set of multiple balance configurations that define one or more balance thresholds for the outbound addresses, determine, based on simulating the movements, a balance configuration for the outbound addresses and the cold address, and broadcast one or more transactions that are configured to move the crypto token between the outbound addresses and the cold address based on the determined balance configuration.

In some examples of the method, apparatuses, and non-transitory computer-readable medium described herein, simulating the movements of the crypto token may include operations, features, means, or instructions for monitoring estimated withdrawal times associated with the simulated movements, where the balance configuration may be determined such that estimated withdrawal times may be reduced for movements between the outbound addresses and external user addresses.

In some examples of the method, apparatuses, and non-transitory computer-readable medium described herein, simulating the movements of the crypto token may include operations, features, means, or instructions for generating a quantity of sweep transactions that correspond to movements of the crypto token from the outbound addresses to the cold address and generating a quantity of restore transactions that correspond to movements of the crypto token from the cold address to the outbound addresses, where the balance configuration may be determined based on the quantity of sweep transactions and the quantity of restore transactions.

In some examples of the method, apparatuses, and non-transitory computer-readable medium described herein, simulating the movements of the crypto token may include operations, features, means, or instructions for comparing the simulated movements with movements corresponding to the corpus of transaction data, where the balance configuration may be determined based on the comparing.

In some examples of the method, apparatuses, and non-transitory computer-readable medium described herein, simulating the movements of the crypto token may include operations, features, means, or instructions for monitoring a ratio of total balance of outbound addresses to a balance of the cold address, where the balance configuration may be determined such that a threshold ratio may be not exceeded.

In some examples of the method, apparatuses, and non-transitory computer-readable medium described herein, the balance configuration indicates a minimum balance for the outbound addresses, a maximum balance for the outbound addresses, or a combination thereof.

In some examples of the method, apparatuses, and non-transitory computer-readable medium described herein, simulating the movements of the crypto token may include operations, features, means, or instructions for simulating the movements using one or more constraints for the outbound addresses, where the balance configuration may be determined based on simulating the movements using the one or more constraints.

In some examples of the method, apparatuses, and non-transitory computer-readable medium described herein, the one or more constraints include a maximum balance for the outbound addresses, a ratio of a minimum balance of the outbound addresses to the maximum balance for the outbound addresses, a maximum increase of the maximum balance for the outbound address over a duration, and a maximum decrease of the maximum balance for the outbound address over the duration.

Some examples of the method, apparatuses, and non-transitory computer-readable medium described herein may further include operations, features, means, or instructions for causing display, at a user interface, an indication of the determined balance configuration and receiving, via the user interface, an indication of acceptance of the balance configuration, where the one or more transactions may be broadcast based on receiving the indication of acceptance.

Some examples of the method, apparatuses, and non-transitory computer-readable medium described herein may further include operations, features, means, or instructions for processing the corpus of transaction data and simulating movements of a second crypto token between the outbound addresses and the cold address and determining a second balance configuration for the outbound addresses and the cold address for the second crypto token, the second balance configuration different from the balance configuration for the crypto token.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for digital token management, comprising:
processing a corpus of transaction data associated with a custodial token platform, the corpus of transaction data indicating movements of a crypto token via a blockchain network and between outbound addresses of the custodial token platform and a cold address managed by the custodial token platform, wherein the outbound addresses are configured for withdrawal of, via the blockchain network, crypto tokens from one or more user accounts at the custodial token platform to one or more blockchain addresses external to the custodial token platform;
simulating, based at least in part on the corpus of transaction data, movements, via the custodial token platform and on the blockchain network, of the crypto token between the outbound addresses and the cold address using a plurality of balance configurations that define one or more candidate balance thresholds for the outbound addresses;
monitoring estimated withdrawal times of the crypto token from the outbound addresses to the one or more blockchain addresses external to the custodial token platform based at least in part on the simulated movements on the blockchain network, wherein the estimated withdrawal times are based at least in part on projected durations for confirmation of transactions on the blockchain network;
determining, based at least in part on simulating the movements and monitoring the estimated withdrawal times, a balance configuration for the outbound addresses and the cold address, the balance configuration comprising one or more thresholds associated with a balance of the outbound addresses, the one or more thresholds being from the one or more candidate balance thresholds;
broadcasting, to a blockchain ledger maintained by a plurality of computing nodes, a first transaction that moves, after verification of the first transaction by one or more computing nodes of the plurality of computing nodes, the crypto token from the cold address to at least one of the outbound addresses based at least in part on a first balance of the outbound addresses being less than a first threshold of the one or more thresholds such that the estimated withdrawal times are reduced for movements between the outbound addresses and the one or more blockchain addresses external to the custodial token platform based at least in part on the determined balance configuration;
broadcasting, to the blockchain ledger maintained by the plurality of computing nodes, a second transaction that moves, after verification of the second transaction by the one or more computing nodes of the plurality of computing nodes, the crypto token from the at least one of the outbound addresses to the cold address based at least in part on a second balance of the outbound addresses exceeding a second threshold of the one or more thresholds;
receiving, at the at least one of the outbound addresses of the custodial token platform and after broadcasting the first transaction, the crypto token from the cold address;
receiving, at the cold address managed by the custodial token platform and after broadcasting the second transaction to the blockchain ledger, the crypto token from the at least one of the outbound addresses; and
broadcasting a withdrawal transaction that moves the crypto token to an external address that is external to the custodial token platform from the at least one of the outbound addresses.

2. The method of claim 1, wherein simulating the movements of the crypto token comprises:
generating a quantity of sweep transactions that correspond to movements of the crypto token from the outbound addresses to the cold address; and
generating a quantity of restore transactions that correspond to movements of the crypto token from the cold address to the outbound addresses, wherein the balance configuration is determined based at least in part on the quantity of sweep transactions and the quantity of restore transactions.

3. The method of claim 1, wherein simulating the movements of the crypto token comprises:
comparing the simulated movements with movements corresponding to the corpus of transaction data, wherein the balance configuration is determined based at least in part on the comparing.

4. The method of claim 1, wherein simulating the movements of the crypto token comprises:

monitoring a ratio of total balance of the outbound addresses to a balance of the cold address, wherein the balance configuration is determined such that a threshold ratio is not exceeded.

5. The method of claim 1, wherein the balance configuration indicates a minimum balance for the outbound addresses, a maximum balance for the outbound addresses, or a combination thereof.

6. The method of claim 1, wherein simulating the movements of the crypto token comprises:
simulating the movements using one or more constraints for the outbound addresses, wherein the balance configuration is determined based at least in part on simulating the movements using the one or more constraints.

7. The method of claim 6, wherein the one or more constraints comprise a maximum balance for the outbound addresses, a ratio of a minimum balance of the outbound addresses to the maximum balance for the outbound addresses, a maximum increase of the maximum balance for the outbound addresses over a duration, and a maximum decrease of the maximum balance for the outbound addresses over the duration.

8. The method of claim 1, further comprising:
causing display, at a user interface, an indication of the determined balance configuration; and
receiving, via the user interface, an indication of acceptance of the balance configuration, wherein the first transaction and the second transaction are broadcast based at least in part on receiving the indication of acceptance.

9. The method of claim 1, further comprising:
processing the corpus of transaction data and simulating movements of a second crypto token between the outbound addresses and the cold address; and
determining a second balance configuration for the outbound addresses and the cold address for the second crypto token, the second balance configuration different from the balance configuration for the crypto token.

10. An apparatus for digital token management, comprising:
one or more memories storing processor-executable code; and
one or more processors coupled with the one or more memories and individually or collectively operable to execute the code to cause the apparatus to:
simulate, using a corpus of transaction data, movements, via a custodial token platform and on a blockchain network, of a crypto token between outbound addresses and a cold address using a plurality of balance configurations that define one or more candidate balance thresholds for the outbound addresses, the outbound addresses and the cold address associated with the custodial token platform, wherein the outbound addresses are configured for withdrawal of, via the blockchain network, crypto tokens from one or more user accounts at the custodial token platform to one or more blockchain addresses external to the custodial token platform;
monitor estimated withdrawal times of the crypto token from the outbound addresses to the one or more blockchain addresses external to the custodial token platform based at least in part on the simulated movements on the blockchain network, wherein the estimated withdrawal times are based at least in part on projected durations for confirmation of transactions on the blockchain network;
determine, based at least in part on simulating the movements and monitoring the estimated withdrawal times, a balance configuration for the outbound addresses and the cold address, the balance configuration comprising one or more thresholds associated with a balance of the outbound addresses, the one or more thresholds being from the one or more candidate balance thresholds;
broadcast, to a blockchain ledger maintained by a plurality of computing nodes, a first transaction that moves, after verification of the first transaction by one or more computing nodes of the plurality of computing nodes, the crypto token from the cold address to at least one of the outbound addresses based at least in part on a first balance of the outbound addresses being less than a first threshold of the one or more thresholds such that the estimated withdrawal times are reduced for movements between the outbound addresses and the one or more blockchain addresses external to the custodial token platform based at least in part on the determined balance configuration;
broadcast, to the blockchain ledger maintained by the plurality of computing nodes, a second transaction that moves, after verification of the second transaction by the one or more computing nodes of the plurality of computing nodes, the crypto token from the at least one of the outbound addresses to the cold address based at least in part on a second balance of the outbound addresses exceeding a second threshold of the one or more thresholds;
receive, at the at least one of the outbound addresses of the custodial token platform and after broadcasting the first transaction, the crypto token from the cold address;
receive, at the cold address managed by the custodial token platform and after broadcasting the second transaction to the blockchain ledger, the crypto token from the at least one of the outbound addresses; and
broadcast a withdrawal transaction that moves the crypto token to an external address that is external to the custodial token platform from the at least one of the outbound addresses.

11. The apparatus of claim 10, wherein, to simulate the movements of the crypto token, the one or more processors are individually or collectively further operable to execute the code to cause the apparatus to:
generate a quantity of sweep transactions that correspond to movements of the crypto token from the outbound addresses to the cold address; and
generate a quantity of restore transactions that correspond to movements of the crypto token from the cold address to the outbound addresses, wherein the balance configuration is determined based at least in part on the quantity of sweep transactions and the quantity of restore transactions.

12. The apparatus of claim 11, wherein, to simulate the movements of the crypto token, the one or more processors are individually or collectively further operable to execute the code to cause the apparatus to:
compare the simulated movements with movements corresponding to the corpus of transaction data, wherein the balance configuration is determined based at least in part on the comparing.

13. The apparatus of claim 10, wherein, to simulate the movements of the crypto token, the one or more processors are individually or collectively further operable to execute the code to cause the apparatus to:
monitor a ratio of total balance of the outbound addresses to a balance of the cold address, wherein the balance configuration is determined such that a threshold ratio is not exceeded.

14. A non-transitory computer-readable medium storing code for digital token management, the code comprising instructions executable by one or more processors to:
process a corpus of transaction data associated with a custodial token platform, the corpus of transaction data indicating movements of a crypto token via a blockchain network and between outbound addresses of the custodial token platform and a cold address managed by the custodial token platform, wherein the outbound addresses are configured for withdrawal of, via the blockchain network, crypto tokens from one or more user accounts at the custodial token platform to one or more blockchain addresses external to the custodial token platform;
simulate, based at least in part on the corpus of transaction data, movements, via the custodial token platform and on the blockchain network, of the crypto token between the outbound addresses and the cold address using a plurality of balance configurations that define one or more candidate balance thresholds for the outbound addresses;
monitor estimated withdrawal times of the crypto token from the outbound addresses to the one or more blockchain addresses external to the custodial token platform based at least in part on the simulated movements on the blockchain network, wherein the estimated withdrawal times are based at least in part on projected durations for confirmation of transactions on the blockchain network;
determine, based at least in part on simulating the movements and monitoring the estimated withdrawal times, a balance configuration for the outbound addresses and the cold address, the balance configuration comprising one or more thresholds associated with a balance of the outbound addresses, the one or more thresholds being from the one or more candidate balance thresholds;
broadcast, to a blockchain ledger maintained by a plurality of computing nodes, a first transaction that moves, after verification of the first transaction by one or more computing nodes of the plurality of computing nodes, the crypto token from the cold address to at least one of the outbound addresses based at least in part on a first balance of the outbound addresses being less than a first threshold of the one or more thresholds such that the estimated withdrawal times are reduced for movements between the outbound addresses and the one or more blockchain addresses external to the custodial token platform based at least in part on the determined balance configuration;
broadcast, to the blockchain ledger maintained by the plurality of computing nodes, a second transaction that moves, after verification of the second transaction by the one or more computing nodes of the plurality of computing nodes, the crypto token from the at least one of the outbound addresses to the cold address based at least in part on a second balance of the outbound addresses exceeding a second threshold of the one or more thresholds;
receive, at the at least one of the outbound addresses of the custodial token platform and after broadcasting the first transaction, the crypto token from the cold address;
receive, at the cold address managed by the custodial token platform and after broadcasting the second transaction to the blockchain ledger, the crypto token from the at least one of the outbound addresses; and
broadcast a withdrawal transaction that moves the crypto token to an external address that is external to the custodial token platform from the at least one of the outbound addresses.

15. The non-transitory computer-readable medium of claim 14, wherein the instructions to simulate the movements of the crypto token are executable by the one or more processors to:
generate a quantity of sweep transactions that correspond to movements of the crypto token from the outbound addresses to the cold address; and
generate a quantity of restore transactions that correspond to movements of the crypto token from the cold address to the outbound addresses, wherein the balance configuration is determined based at least in part on the quantity of sweep transactions and the quantity of restore transactions.

16. The non-transitory computer-readable medium of claim 14, wherein the instructions to simulate the movements of the crypto token are executable by the one or more processors to:
compare the simulated movements with movements corresponding to the corpus of transaction data, wherein the balance configuration is determined based at least in part on the comparing.

17. The non-transitory computer-readable medium of claim 14, wherein the instructions to simulate the movements of the crypto token are executable by the one or more processors to:
monitor a ratio of total balance of the outbound addresses to a balance of the cold address, wherein the balance configuration is determined such that a threshold ratio is not exceeded.

* * * * *